United States Patent
Sakhnini et al.

(10) Patent No.: US 11,924,862 B2
(45) Date of Patent: Mar. 5, 2024

(54) SSB, CORESET, SIB SIGNAL BLOCK FOR INITIAL ACCESS INFORMATION

(71) Applicant: QUALCOMM Incorporated, San Diego, CA (US)

(72) Inventors: Iyab Issam Sakhnini, San Diego, CA (US); Tao Luo, San Diego, CA (US); Juan Montojo, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/236,806

(22) Filed: Apr. 21, 2021

(65) Prior Publication Data

US 2022/0361178 A1    Nov. 10, 2022

(51) Int. Cl.
*H04W 56/00* (2009.01)
*H04L 27/26* (2006.01)
*H04W 72/044* (2023.01)
*H04W 72/0446* (2023.01)
*H04W 72/0453* (2023.01)
(Continued)

(52) U.S. Cl.
CPC ....... *H04W 72/53* (2023.01); *H04L 27/26025* (2021.01); *H04L 27/2607* (2013.01); *H04W 56/001* (2013.01); *H04W 72/0446* (2013.01); *H04W 72/0453* (2013.01); *H04W 72/046* (2013.01); *H04W 72/30* (2023.01)

(58) Field of Classification Search
CPC ............. H04W 7/0493; H04W 56/001; H04W 72/005; H04W 72/0446; H04W 72/0453; H04W 72/046; H04L 27/26025; H04L 27/2607

USPC ......................................................... 370/329
See application file for complete search history.

(56) References Cited

U.S. PATENT DOCUMENTS

2018/0219596 A1* 8/2018 He .................. H04L 5/0053
2018/0294863 A1* 10/2018 Nilsson ............ H04W 16/28
(Continued)

FOREIGN PATENT DOCUMENTS

CN           111052665 A      4/2020

OTHER PUBLICATIONS

Zheng, Hui-run, Method for Transmitting and Receiving System Information in a Communication System, Apr. 21, 2020, 18 pages ( Year: 2020).*

(Continued)

*Primary Examiner* — Sai Ming Chan
(74) *Attorney, Agent, or Firm* — Procopio, Cory, Hargreaves & Savitch

(57) ABSTRACT

A base station may transmit, to a UE, at least one of the SS, the PBCH, the CORESET, or the SIB, via the plurality of resources based on the indication of the at least one initial access structure. In some aspects, the SS may be time-division multiplexed with the PBCH and may be frequency-division multiplexed with the CORESET and the SIB. In one aspect, the CORESET may be time-division multiplexed with the SIB. In another aspect, the CORESET may be frequency-division multiplexed with the SIB. In some aspects, at least one switching gap may be configured after the at least one initial access structure, the at least one switching gap being configured based on an SCS.

30 Claims, 21 Drawing Sheets

(51) Int. Cl.
*H04W 72/30* (2023.01)
*H04W 72/53* (2023.01)

(56) References Cited

U.S. PATENT DOCUMENTS

| | | | | |
|---|---|---|---|---|
| 2019/0239204 | A1* | 8/2019 | Zhang | H04W 24/00 |
| 2020/0274750 | A1* | 8/2020 | Yi | H04L 27/2613 |
| 2020/0275430 | A1* | 8/2020 | Salem | H04L 1/1614 |
| 2020/0288482 | A1* | 9/2020 | Yi | H04L 5/0064 |
| 2020/0396744 | A1* | 12/2020 | Xiong | H04W 72/0446 |
| 2021/0152224 | A1* | 5/2021 | Osawa | H04W 72/042 |
| 2021/0160117 | A1* | 5/2021 | Xiong | H04W 56/001 |
| 2021/0235339 | A1* | 7/2021 | Babaei | H04W 76/27 |
| 2021/0281308 | A1* | 9/2021 | Wong | H04B 7/063 |
| 2022/0264323 | A1* | 8/2022 | Yang | H04W 72/044 |

OTHER PUBLICATIONS

3GPP TS 38.213: "3rd Generation Partnership Project, Technical Specification Group Radio Access Network, NR, Physical Layer Procedures for control (Release 16)", 3GPP Standard, Technical Specification, 3rd Generation Partnership Project, Mobile Competence Centre, 650, Route Des Lucioles, F-06921 Sophia-Antipolis Cedex, France, vol. RAN WG1, No. V16.5.0, Mar. 30, 2021, XP052000308, pp. 1-183.

3GPP TS 38.331: "3rd Generation Partnership Project, Technical Specification Group Radio Access Network, NR, Radio Resource Control (RRC) Protocol Specification (Release 16)", 3GPP Standard, Technical Specification, 3GPP, Mobile Competence Centre, 650, Route Des Lucioles, F-06921 Sophia-Antipolis Cedex, France, vol. RAN WG2, No. V16.4.1, Mar. 30, 2021, pp. 1-949, XP052000246, URL:https://ftp.3gpp.org/Specs/archive/38_series/38.331/38331-g41.zip 38331-g41.docx.

Huawei., et al., "Initial Access Signal and Channels in NR Unlicensed Band", 3GPP TSG RAN WG1 Meeting #98bis, R1-1910042, 3GPP, Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 8, 2019, XP051788849, 20 Pages, URL:http://www.3gpp.org/ftp/tsg_ran/WG1_RL1/TSGR1_98b/Docs/R1-1910042.zip.

International Search Report and Written Opinion—PCT/US2022/021816—ISA/EPO dated Jul. 14, 2022.

Moderator (Intel Corporation): "Summary#5 of Email Discussion on Initial Access Aspect of NR Extension up to 71 Ghz", 3GPP TSG RAN WG1 Meeting #104-e, R1-2102238, 3GPP, Mobile Competence Centre, 650, Route Des Lucioles, F-06921 Sophia-Antipolis Cedex, France, vol. RAN WG1, No. e-Meeting, Jan. 25, 2020-Feb. 5, 2020, Feb. 8, 2021, XP051977800, pp. 1-198, URL:https://ftp.3gpp.org/tsg_ran/WG1_RL1/TSGR1_104-e/Docs/R1-2102238.zip R1-2102238, 60ghz email_discussion_01_final.docx.

Nokia., et al., "Required changes to NR Using Existing DL/UL NR Waveform", 3GPP TSG RAN WG1 #102-e, R1-2006907, 3GPP, Mobile Competence Centre, 650, Route Des Lucioles, F-06921 Sophia-Antipolis Cedex, France, vol. RAN WG1, No. e-Meeting, Aug. 17, 2020-Aug. 29, 2020, 7, Aug. 2020, XP051915529, 32 Pages, URL:https://ftp.3gpp.prg/tsg_ran/WGI_RL1/TSGR1_102-e/Docs/R1-2006907.zip R1-2006907, Required changes to NR using existing DL-UL NR waveform.docx.

Qualcomm Incorporated: "Initial Access Aspects for NR to Support Operation Between 52.6 GHz and 71 GHz", 3GPP Draft, 3GPP TSG-RAN WG1 #104-e, R1-2101453, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021, XP051971618, 14 Pages.

* cited by examiner

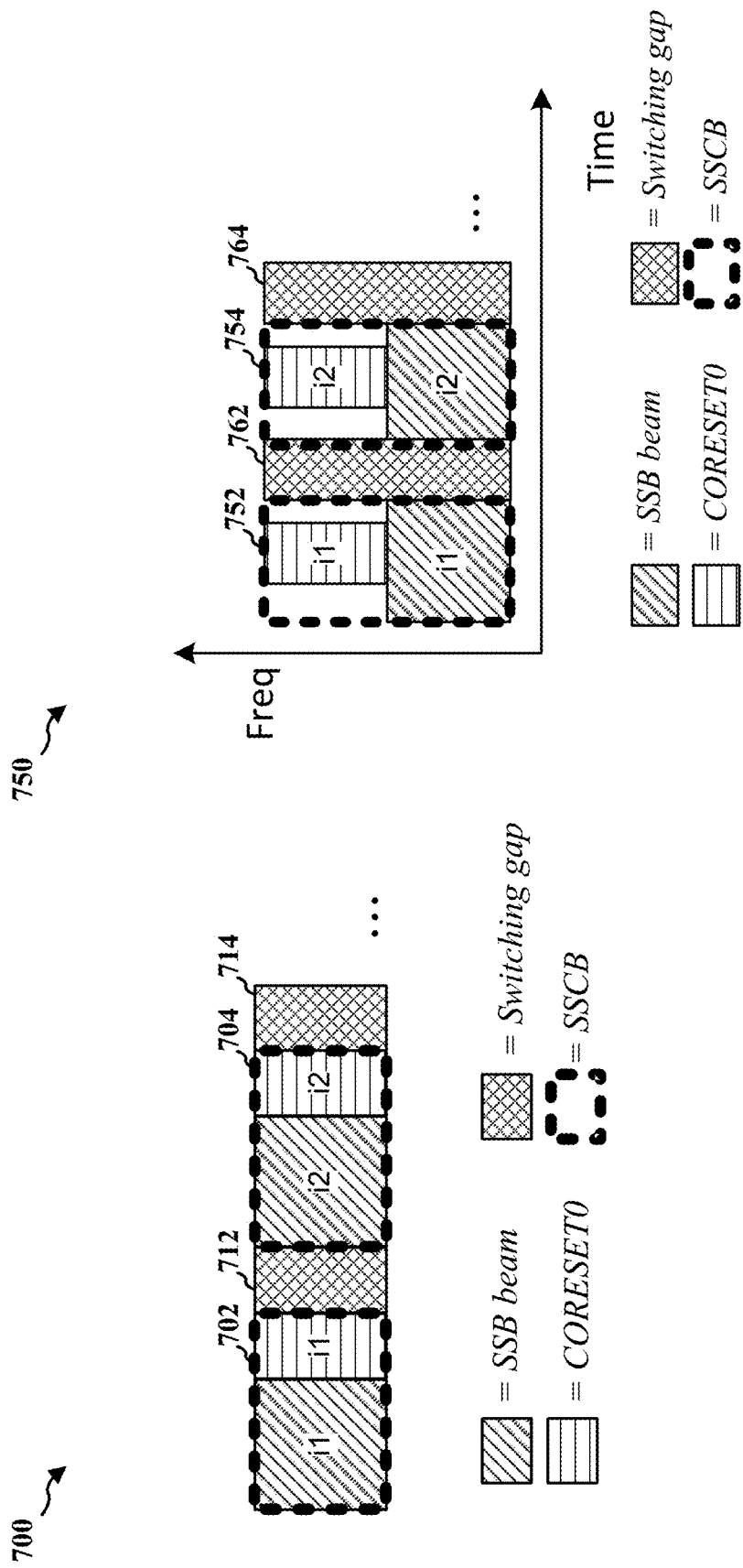

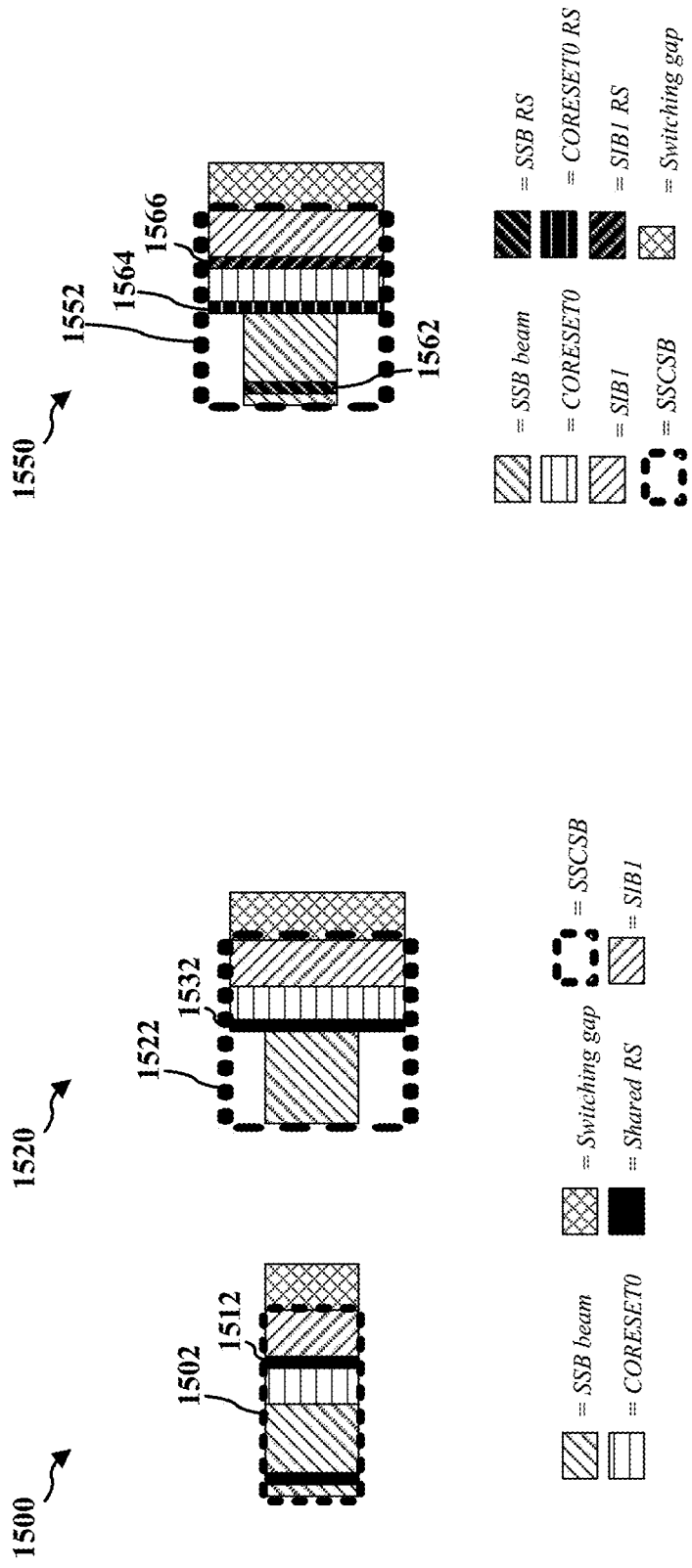

SSB, CORESET, SIB SIGNAL BLOCK FOR INITIAL ACCESS INFORMATION

BACKGROUND

Technical Field

The present disclosure relates generally to communication systems, and more particularly, to wireless communication including initial access structures.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time-division multiple access (TDMA) systems, frequency-division multiple access (FDMA) systems, orthogonal frequency-division multiple access (OFDMA) systems, single-carrier frequency-division multiple access (SC-FDMA) systems, and time-division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a base station and a user equipment (UE). The base station may determine at least one initial access structure for each beam in a plurality of beams, each of the at least one initial access structure including at least one of a synchronization signal (SS), a physical broadcast channel (PBCH), a control resource set (CORESET), or a system information block (SIB), configure a plurality of resources for transmitting the at least one initial access structure, and transmit, to the UE, an indication of the at least one initial access structure for transmitting via the plurality of resources. In one aspect, the indication may be associated with at least one of the CORESET or the SIB.

The base station may transmit, to the UE, at least one of the SS, the PBCH, the CORESET, or the SIB, via the plurality of resources based on the indication of at least one initial access structure. The UE may monitor for the SS transmitted from the base station based on the indication of at least one initial access structure for each beam in the plurality of beams and receive at least one of the PBCH, the CORESET, or the SIB of at least one initial access structure. In some aspects, at least one switching gap may be configured after at least one initial access structure, the at least one switching gap being configured based on a subcarrier spacing (SCS). In one aspect, at least one switching gap may be configured within a cyclic prefix (CP) of at least one initial access structure based on an inverse of the SCS for the SS being greater than or equal to a threshold gap value.

In some aspects, the SS may be time-division multiplexed with the PBCH and may be frequency-division multiplexed with the CORESET and the SIB, where the CORESET may carry scheduling information for the SIB. In one aspect, the CORESET may be time-division multiplexed with the SIB. In another aspect, the CORESET may be frequency-division multiplexed with the SIB.

In one aspect, the SS may be time-division multiplexed with one of the PBCH or the CORESET and may be frequency-division multiplexed with the SIB, where the one of the PBCH or the CORESET may carry scheduling information for the SIB. In another aspect, the SS may be time-division multiplexed with the PBCH and may be frequency-division multiplexed with the SIB, where scheduling information for the SIB or one or more SIB parameters may be preconfigured.

In some aspects, one or more waveforms for the SS and the PBCH may be the same as, or different from one or more waveforms for at least one of the CORESET or the SIB, and the one or more waveforms for the CORESET may be the same as, or different from the one or more waveforms for the SIB. In some aspects, the PBCH may include a master information block (MIB) indicating at least one of a frequency allocation, a bandwidth, or a time duration of the CORESET.

The base station may transmit, to the UE, at least one reference signal associated with at least one of the PBCH, the CORESET, or the SIB. In some aspects, at least one reference signal may include a shared reference signal associated with at least one of the PBCH, the CORESET, or the SIB. The UE may perform channel estimation of at least one of the SS, the PBCH, the CORESET, or the SIB based on at least one reference signal, and decode at least one of the SS, the PBCH, the CORESET, or the SIB based on the performed channel estimation. In one aspect, a frequency bandwidth of at least one of the SS, the PBCH, the CORESET, or the SIB may be preconfigured.

In some aspects, the channel estimation of at least one of the SS, the PBCH, the CORESET, or the SIB may be performed based on a list of bandwidth candidates for at least one reference signal. In some aspects, a frequency bandwidth of at least one of the SS, the PBCH, the CORESET, or the SIB may be indicated in a reference signal of a preceding channel of at least one of the SS, the PBCH, the CORESET, or the SIB. In some aspects, the channel estimation of at least one of the SS, the PBCH, the CORESET, or the SIB may be performed based on a frequency bandwidth of a preceding channel of at least one of the SS, the PBCH, the CORESET, or the SIB.

In one aspect, at least one reference signal may include one or more frequency domain symbols in a dedicated discrete Fourier transform-spread-orthogonal frequency-division multiplexing (DFT-s-OFDM) symbol. In another aspect, at least one reference signal may include one or more frequency domain symbols subsequent to the determination of at least one initial access structure. In another aspect, at least one reference signal may include one or more time domain symbols prior to the determination of at least one initial access structure.

In some aspects, at least one of an SS, a PBCH, a CORESET, or a SIB of a previous initial access structure indicates a periodicity of at least one initial access structure. In some aspects, at least one reference signal of a previous initial access structure may indicate a periodicity of at least one initial access structure. In some aspects, a periodicity of at least one of the SS, the PBCH, the CORESET, or the SIB may be configured with at least one pattern or configured based on a system frame number (SFN) or at least one slot.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 7A and 7B illustrate examples of an initial access structure of a method of wireless communication.

FIGS. 15A and 15B illustrate examples of an initial access structure of a method of wireless communication.

DETAILED DESCRIPTION

Figure 1:
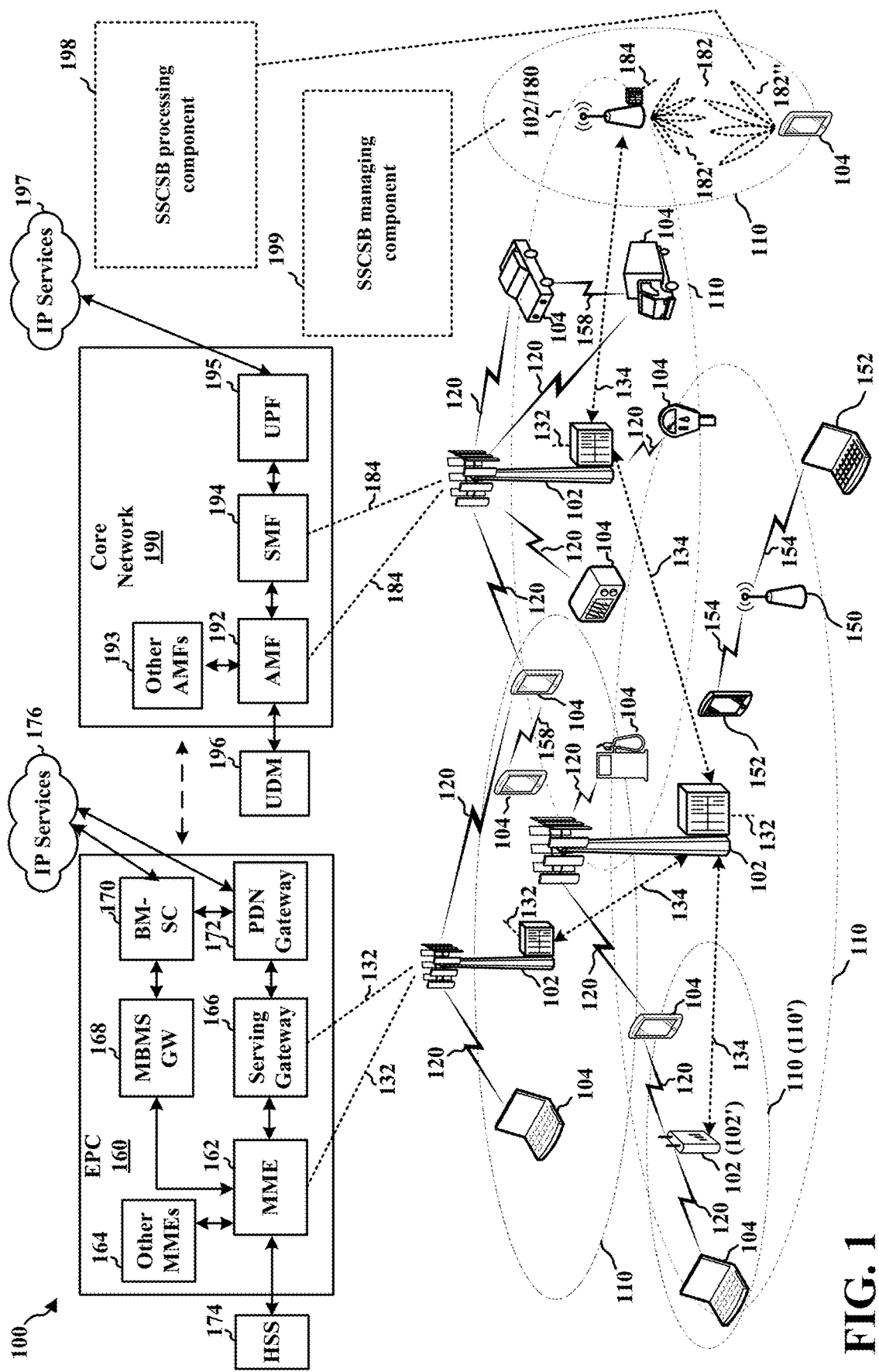
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer-executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase the capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include an SSB/CORESET/SIB (SSCSB) processing component 198 configured to receive, from a base station, an indication of at least one initial access structure for each beam in a plurality of beams, the initial access structure including at least one of an SS, a PBCH, a CORESET, or a SIB, and receive, from the base station, at least one of the SS, the PBCH, the CORESET, or the SIB, via a plurality of resources based on the indication of the at least one initial access structure. In certain aspects, the base station 180 may include an SSCSB managing component 199 configured to determine at least one initial access structure for each beam in a plurality of beams, each of the at least one initial access structure including at least one of the SS, the PBCH, the CORESET, or the SIB, configure a plurality of resources for transmitting the at least one initial access structure to the UE, and transmit the indication of the at least one initial access structure for transmitting via the plurality of resources. Although the following description may be focused on 5G NR, the concepts described herein may be applicable to other similar areas, such as LTE, LTE-A, CDMA, GSM, and other wireless technologies.

Figure 2:
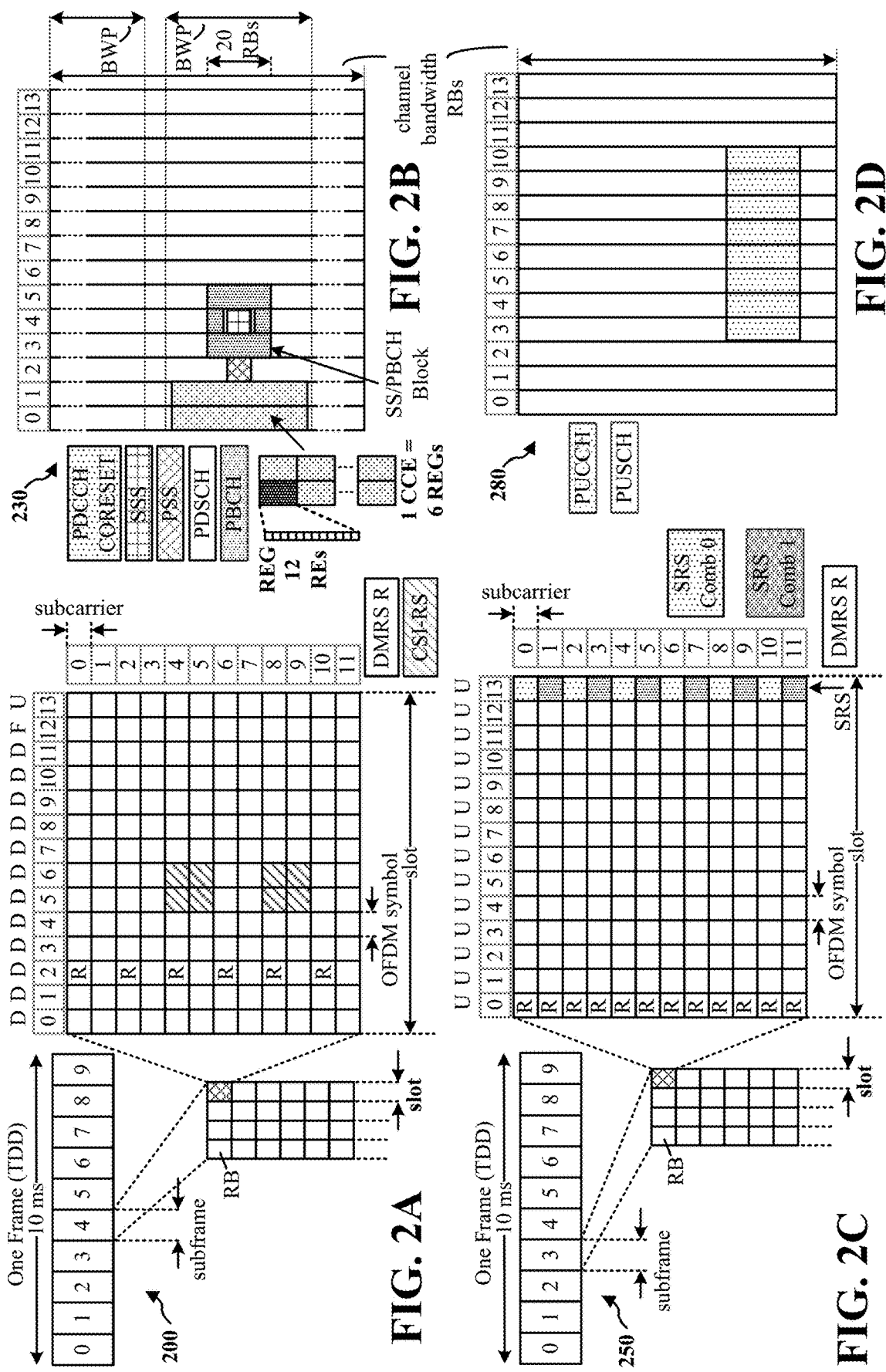
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency-division duplexed (FDD) in which for a particular set of subcarriers (carrier system bandwidth), subframes within the set of subcarriers are dedicated for either DL or UL, or may be time-division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency-division multiplexed. Each BWP may have particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH, such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
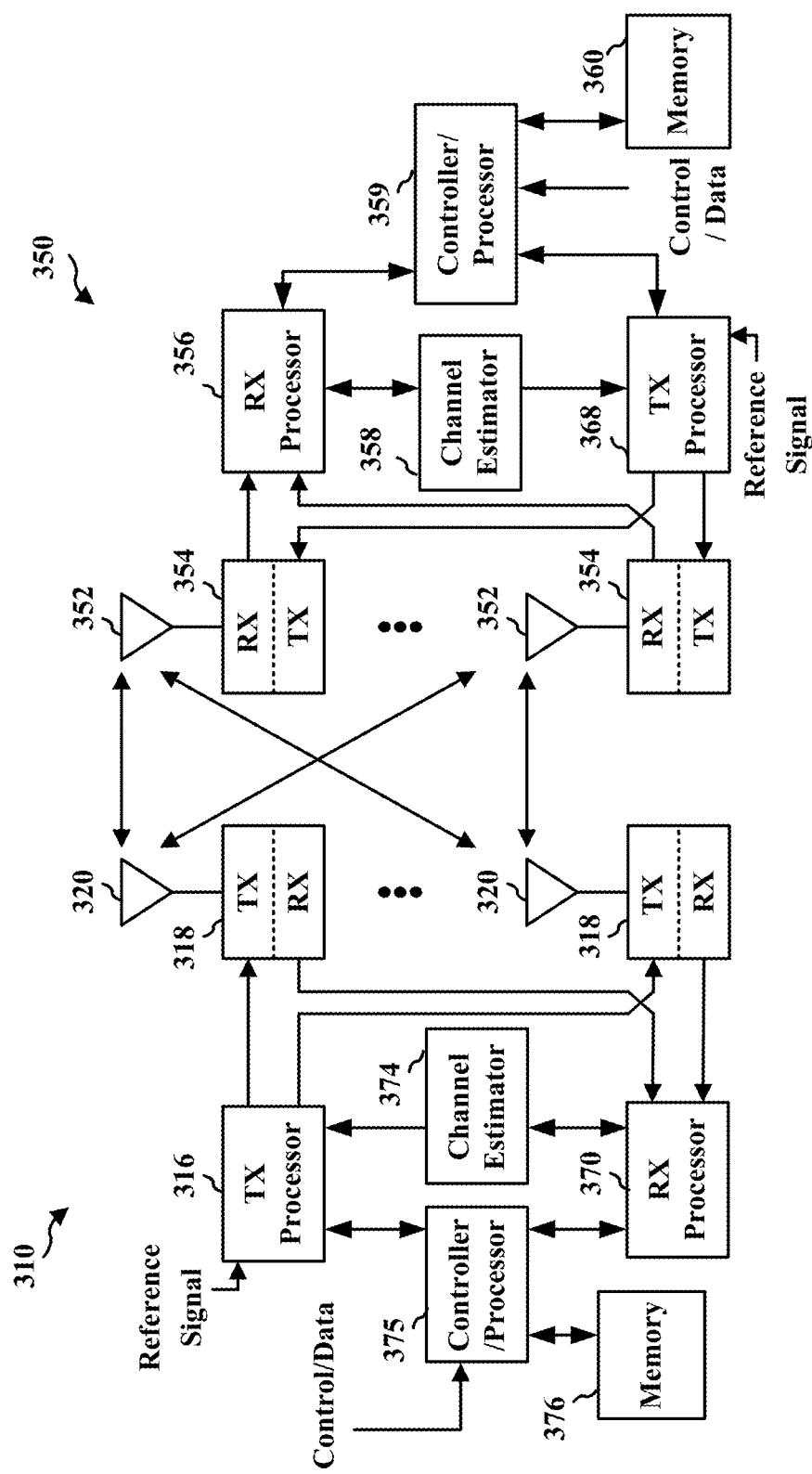
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the base station 310 in a manner similar to that described in connection with the receiver function at the UE 350. Each receiver 318 RX receives a signal through its respective antenna 320. Each receiver 318RX recovers information modulated onto an RF carrier and provides the information to an RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199 of FIG. 1.

Figure 4:
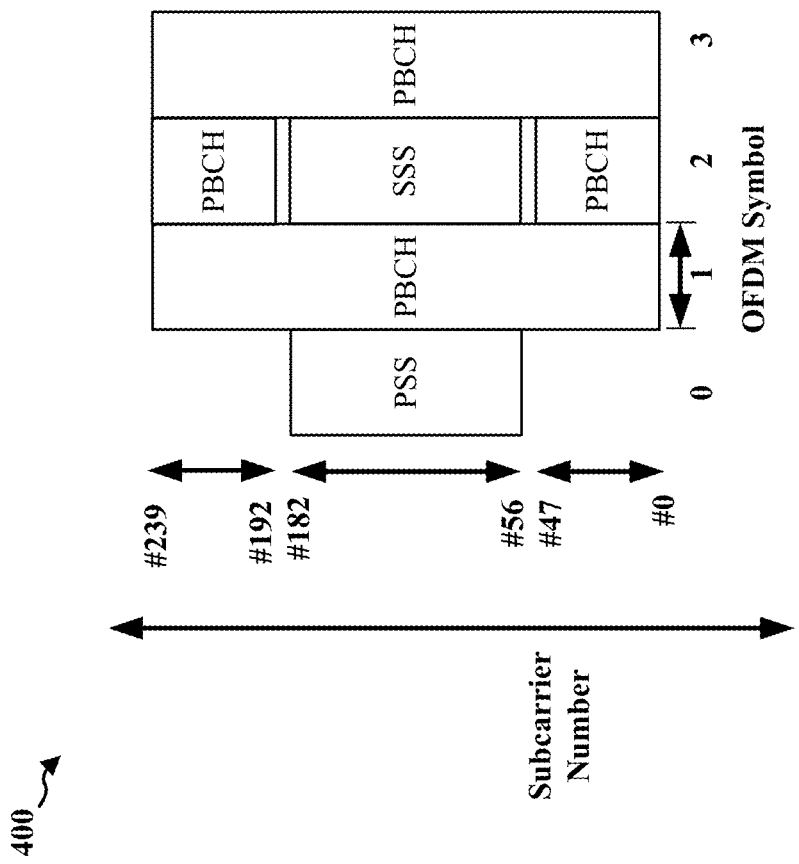
FIG. 4 illustrates an example SSB 400 of a method of wireless communication.

In some wireless communication systems, a base station may transmit an SSB that receiving UEs may use for an initial cell search. In some aspects, the UE may use the PSS/SSS/PBCH/DMRS signals in the SSB to refine the frequency offset estimation. FIG. 4 illustrates an example SSB 400 of a method of wireless communication. The SSB 400 may span 4 OFDM symbols with 1 symbol for a PSS, 2 symbols for a PBCH, and 1 symbol with an SSS and a PBCH frequency domain multiplexed with each other. By way of example, in some wireless communication systems, an SCS of 15 kHz or 30 kHz may be used for FR1 and SCS of 120 kHz or 240 kHz may be used for FR2. The PSS may use a length 127 frequency domain-based M-sequence (mapped to 127 subcarriers). For example, the PSS may have 3 possible sequences. The SSS may use a length 127 frequency domain-based Gold Code sequence (e.g., 2 M-sequences) (mapped to 127 subcarriers). By way of example, there may be a total of 1008 possible sequences for the SSS. The PBCH may be QPSK modulated, and the UE may coherently demodulate the PBCH using an associated DM-RS from the base station. During an initial search, a UE searcher may use a sliding window and correlation technique to look for the PSS. For each timing hypothesis associated with the sliding window, the UE may try all 3 possible PSS sequences and N frequency domain hypothesis to account for Doppler, internal clock frequency shifts, and any other frequency errors.

The base station may generate the PSS based on an M-sequence and transmit the PSS to the UE. In some aspects, the PSS may be represented as d(n)=1−2x(m). The PSS may be determined as one sequence out of three (3) possible sequences. The PSS sequence may have a sequence length of 127, and the PSS may have a one (1) symbol length. The PSS sequence may be determined based on a cell ID part 2, $N_{ID}^{(2)}$, of the cell associated with the PSS. In some aspects, m may be determined as m=(n+43$N_{ID}^{(2)}$)mod 127, where 0≤n<127. The cell ID part 2 may have 1 value out of three (3) possible values. For example, the cell ID part 2 may be represented as $N_{ID}^{(2)}$=0, 1, 2. Accordingly, the UE may use the PSS to estimate the timing/frequency synchronization. That is, the UE may use the PSS to perform at least one of a symbol timing estimation, an initial frequency offset estimation, or a generation of a cell identity (ID) part 2 of the cell associated with the PSS.

The SSS may be generated based on two (2) M-sequences, $m_0$ and $m_1$, i.e., the Gold code. The SSS may be represented as d(n)=[1−2$x_0$((n+$m_0$)mod 127)][1−2$x_1$((n+$m_1$)mod 127)]. The SSS may be determined as one sequence out of 336 possible sequences. The SSS sequence may have a sequence length of 127, and the PSS may have a one (1) symbol length. The SSS sequence may be determined based on a cell ID part 1, $N_{ID}^{(1)}$, and the cell ID part 2, $N_{ID}^{(2)}$, of the cell associated with the SSS. In some aspects, $m_0$ may be determined as $$m_0 = 3\left[\frac{N_{ID}^{(1)}}{112}\right] + N_{ID}^{(2)},$$

and $m_1$ may be determined as $m_1$=$N_{ID}^{(1)}$ mod 112+$m_0$+1. The SSS may be determined as one sequence of 336 possible sequences. The cell ID part 1 may have 1 value out of 336 possible values. For example, the cell ID part 1 may be represented as $N_{ID}^{(1)}$=0, 1, 2, ..., 225. Accordingly, the UE may use the SSS after estimating the timing/frequency synchronization based on the PSS to generate the cell ID part 1 of the cell associated with the SSS.

Accordingly, the UE may generate the physical cell ID as represented as $N_{ID}^{cell}$=3N$N_{ID}^{(1)}$$N_{ID}^{(2)}$ based on the cell ID part 1 determined based on the SSS and the cell ID part 2 determined based on the PSS.

The PBCH may carry the MIB and may be QPSK modulated. The UE may coherently demodulate the PBCH using an associated DM-RS from the base station. Referring to FIG. 4, the PBCH may include 576 Res, i.e., 240×2+48+48.

The PBCH DM-RS may function as a reference signal for decoding the PBCH. The UE may use the PBCH DM-RS for channel estimation of the PBCH to demodulate the PBCH. For FR2, the PBCH DM-RS may carry the 3 least significant bits (LSBs) of the SSB index per half frame from the DMRS sequence index. The PBCH DM-RS REs may be interleaved with the PBCH data every $4^{th}$ subcarrier (SC). In one aspect, the DM-RS may include 144 Res, i.e., 60×2+12+12. In one aspect, the total number of bits of the PBCH may be 31 for FR2. In one aspect, the PBCH for FR2 may include the following fields.

TABLE 1

Fields of PBCH for FR2
MIB

| | |
|---|---|
| System frame number (SFN) | 6 bits |
| Subcarrier spacing (SCS) common | 1 bit (15 or 60, 30 or 160) |
| System signal block (SSB) SC offset | 4 bits |
| DMRS type A position | 1 bit |
| Pdcch-ConfigSIB1 | |
| controlResourceSetZero | 4 bits |
| searchSpaceZero | 4 bits |
| Cell barred | 1 bit |
| IntraFreq Reselection | 1 bit |
| Spare | 1 bit |
| PBCH multiplexed bits in L1 | |
| SFN | 4 bits |
| Half-frame bit | 1 bit |
| master signal block (MSB) of SSB index | |

In some aspects, the MIB carried in the PBCH may include an indication of at least one CORESET. At least one CORESET may include a CORESET0 configured to schedule the SIB1. In one aspect, the MIB may include a parameter pdcch-ConfigSIB1 including 4 bits of a controlResourceSetZero field indicating CORESET0 and 4 bits of a searchSpaceZero field indicating search space set 0. That is, the 4 bits of the controlResourceSetZero field may determine the multiplexing pattern and frequency offset, the number of RBs, or the number of symbols of the CORESET0. The 4 bits of the searchSpaceZero field may determine the CORESET0 time location, e.g., the value of 0 is used for multiplexing patterns 2 and 3.

The base station may send a grant for a system information block type 1 (SIB1) PDSCH in DCI format 1_0 with a cyclic redundancy check (CRC) scrambled by a system information radio network temporary identifier (RNTI) (SI-RNTI). Here, the SIB1 may refer to the SIB that may be carrying the cell access information. The base station may send the DCI using the PDCCH type0 on the search space set 0 on CORESET0. In some aspects, the total number of bits for the DCI format 1_0 may be 37, 39, or 41 bits. In one aspect, the DCI format 1_0 may include the following fields.

In some aspects, higher NR operating bands may have larger bandwidths, and the higher operating frequency bands may cause higher residual noise. To address the noise, more lenient SCSs may be provided for the higher operating band, and several designs of the waveform may be provided for the DL operation for higher NR operating bands having larger bandwidths. In one aspect, a single carrier frequency domain implementation, e.g., DFT-s-OFDM, may have a low peak-to-average power ratio (PAPR) that may provide better coverage, support a single tap frequency domain equalization (FDE), or an efficient BW utilization from not having a guard band. In another aspect, a single carrier time domain implementation, e.g., SC-QAM, may have a lower PAPR which may provide better coverage, or a low complexity implementation from not having an FFT/IFFT. In another

TABLE 2

DCI format 1_0 fields

| Field | Number of bits | comments |
|---|---|---|
| frequency domain resource assignment (FDRA) | 9, 11, 13 bits (for 24, 48, 96 RBs) | $\log_2(N_{RB}(N_{RB} + 1)/2)$, $N_{RB}$ = size of CORESET0 |
| time domain resource assignment (TDRA) | 4 bits | |
| Virtual resource block (VRB) to physical resource block (PRB) mapping | 1 bit | 0 = non-interleaved 1 = interleaved |
| Modulation and coding scheme (MCS) | 5 bits | |
| Redundancy version (RV) | 2 bits | |
| System information (SI) indicator | 1 bit | 0 = SIB1, 1 = SI message |
| Reserved bits | 15 bits | |

In some aspects, the SSB symbol and the CORESET0 symbol for FR2 may be multiplexed to have various multiplexing patterns. In one aspect, the SSB symbol and the CORESET0 symbol may be time-division multiplexed, i.e., multiplexing pattern 1. In another aspect, the SSB symbol and the CORESET0 symbol may use different SCSs, and may be frequency-division multiplexed and time-division multiplexed, i.e., using multiplexing pattern 2. In another aspect, the SSB symbol and the CORESET0 symbol may use the same SCS and may be frequency-division multiplexed, i.e., using multiplexing pattern 3. The MIB may carry the pdcch-ConfigSIB1 parameter, including the controlResourceSetZero field (4 bits) and the searchSpaceZero field (4 bits). The controlResourceSetZero field may indicate the multiplexing pattern and the CORESET0 frequency offset, the number of RBs, and the number of symbols, and the searchSpaceZero field may indicate the CORESET0 time location. In one aspect, the searchSpaceZero field may have a value 0 for multiplexing patterns 2 and 3. In some aspects, the CORESET0 may be 1, 2, or 3 symbols long and have 24, 48, or 96 RBs.

aspect, an OFDM may have a higher PAPR that may cause distortion of a signal, a higher SNR, a higher spectral efficiency, a higher order MIMO to achieve relatively higher data rate, a single tap FDE, an efficient BW utilization from not having a guard band, and an easier FDM capability.

Figure 5A:
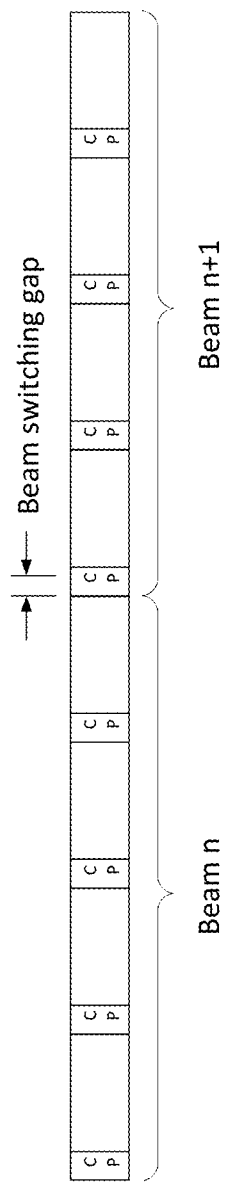
FIGS. 5A and 5B illustrate examples of beam switching.
Figure 5B:
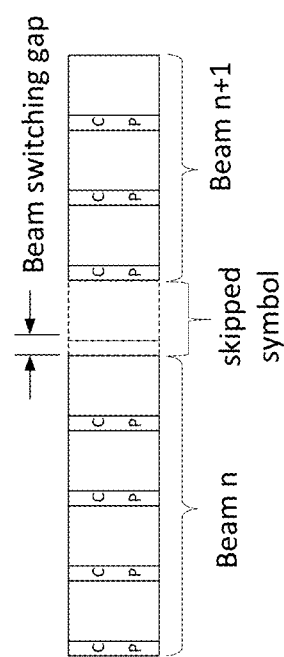

FIGS. 5A and 5B illustrate examples of beam switching. FIG. 5A includes a first example 500 with a beam switching gap absorbed by a CP, and FIG. 5B includes a second example 550 with a beam switching gap longer than the CP. In some aspects, the higher operation bands may have increased SCS, e.g., 960 kHz, 1920 kHz, or 3840 kHz, to reduce phase noise and to increase the overall channelization bandwidth with a manageable FFT size. In some aspects, increasing the SCS may proportionally decrease the symbol time and the CP. Table 3 may provide examples of the CP length ($T_{CP}$) and the symbol time ($T_{symb}$) associated with the SCS.

TABLE 3

Examples of $T_{CP}$ and $T_{symb}$ associated with the SCS

| u | 0 | 1 | 2 | 3 | 4 | 5 | 6 | 7 | 8 |
|---|---|---|---|---|---|---|---|---|---|
| SCS (kHz) | 15 | 30 | 60 | 120 | 240 | 480 | 960 | 1920 | 3840 |
| $T_{CP}$ (ns) | 4687.5 | 2343.8 | 1171.9 | 585.9 | 293.0 | 146.5 | 73.2 | 36.6 | 18.3 |
| $T_{symb}$ (ns) | 66666.7 | 33333.3 | 16666.7 | 8333.3 | 4166.7 | 2083.3 | 1041.7 | 520.8 | 260.4 |

Beam switching gaps may be provided between consecutive SSB beams to facilitate the beam switching. That is, to switch between different SSB beams, a beam switching gap may be provided between the two different SSB beams. In some aspects, the CP length may be long enough to absorb the beam switching gap. Referring to the first example 500, the beam switching gaps may be approximately 100 ns. The CP length may be long enough, e.g., greater than 100 ns, to absorb the SSB beam switching gap. Accordingly, the CP may absorb the SSB beam switching gap, and the beam may be switched from the beam n to the beam n+1 without a beam switching gap.

In some aspects, higher operation bands with higher SCS may have relatively shorter CP length and symbol time, and the CP length may not be long enough to absorb the beam switching gap. The second example 550 may be for higher bands, i.e., higher SCS, and may have relatively shorter symbol times and CP length. The CP length may not be long enough to absorb the beam switching gap within the CP. For example, for the SCS=3840 kHz, the CP length may be 18.3 ns, which is shorter than the beam switching gap, which may be approximately 100 ns. Accordingly, the beam switching gap may become considerably increased in length compared to the symbol length and also result in a larger signaling overhead and increased wasted resources. In some aspects, a gap may be provided to extend to the symbol level resolution. In one aspect, referring to the second example 550, the first SSB symbol for the beam n+1 may be skipped to accommodate the beam switching gap that is larger than the CP length.

Figure 6A:
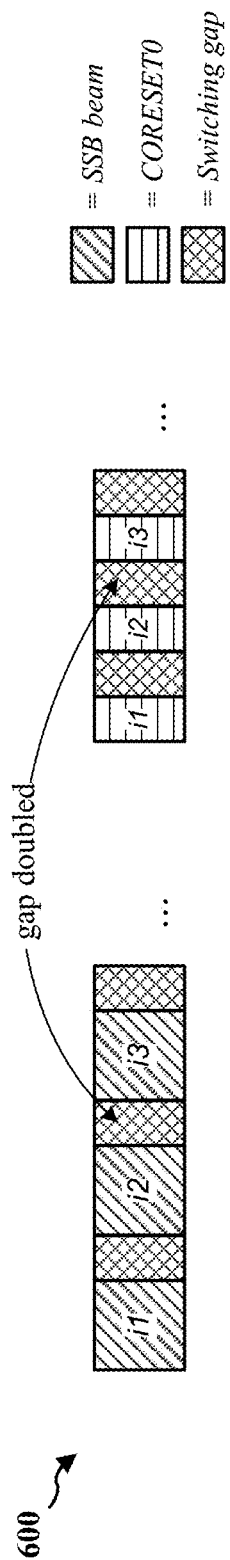
FIGS. 6A and 6B illustrate examples of SSB/CORESET patterns, including beam switching gaps.
Figure 6B:
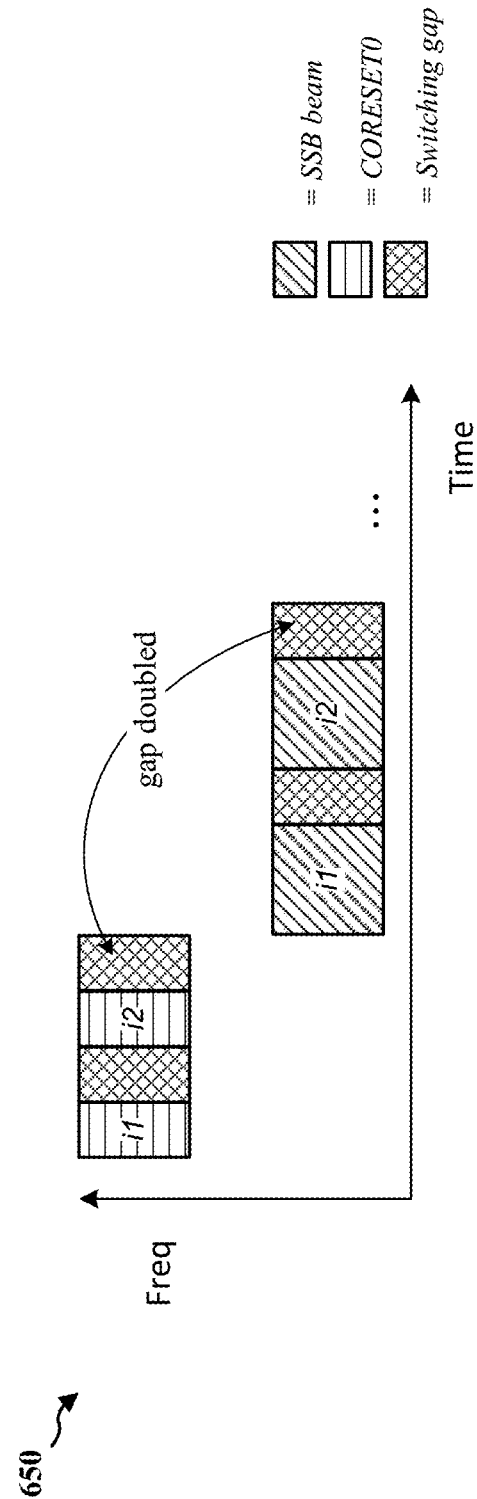

FIGS. 6A and 6B illustrate examples of SSB/CORESET patterns, including beam switching gaps. FIG. 6A illustrates the example 600 of SSB/CORESET pattern using a multiplexing pattern 1, and FIG. 6B illustrates an example 650 of the SSB/CORESET pattern using a multiplexing pattern 2. In some aspects, the CORESET may include CORESET0. The higher operation bands with higher SCS may have relatively shorter CP length and symbol time, and a beam switching gap may be provided between different beams. In some aspects, using the multiplexing pattern 1, where the CORESET0 is time-division multiplexed with the SSB, the beam switching gaps may be provided between each SSB beam as well as each CORESET0 of different beams. That is, the beam switching gaps may be provided between the SSB beams and between CORESET0 of different beams, doubling the wasted resources in the time domain to provide the beam switching gaps, i.e., 600. In some aspects, using the multiplexing pattern 2, where the CORESET0 is frequency-division multiplexed and time-division multiplexed, the beam switching gaps may be provided between each SSB beams as well as each CORESET0 of different beams may still double the wasted resourced in the time domain to provide the beam switching gaps, i.e., 650. In some aspects, using the multiplexing pattern 3, where the CORESET0 is frequency-division multiplexed, the beam switching gaps may be provided between the SSB beams and between CORESET0 of different beams without doubling the wasted resources in the time domain. However, using the multiplexing pattern 3 may not be applicable in single carrier waveform cases, e.g., in a single carrier QAM (SC-QAM).

In some aspects, initial access structures carrying initial access information messages having various patterns of at least one of the SS, the PBCH, the CORESET, and/or the SIB may be provided to reduce the beam switching gap in the higher operation bands. Here, the initial access structure may refer to the channel/message that carries the information message that may be received from the base station for the UE to perform the initial access procedure.

FIGS. 7A and 7B illustrate examples of an initial access structure of a method of wireless communication. FIG. 7A illustrates an example 700 including the SSB and the CORE-SET grouped in the time domain in a single block. That is, the example 700 may include an SSB/CORESET block (SSCB) including the SSB and the CORESET of the same beam time-division multiplexed in a single block. In some aspects, the CORESET may include CORESET0. The SS, the PBCH, and the CORESET0 in the SSCB may be associated with the same beam, and the SSCB may omit beam switching gaps between the SS, the PBCH, and the CORESET0 in the SSCB. The switching gaps may be provided between the SSCBs for different beams. The example 700 may provide that a first beam switching gap 712 is provided after a first SSCB 702 for a first beam and before a second SSCB 704 for a second beam and that a second beam switching gap 714 is provided after the second SSCB 704 for the second beam.

FIG. 7B illustrates an example 750, including the SSB and the CORESET grouped in the frequency domain in a single block. That is, the example 750 may include an SSCB including the SSB and the CORESET of the same beam frequency-division multiplexed in a single block. In some aspects, the CORESET may include CORESET0. The SS, the PBCH, and the CORESET0 associated with the same beam may be included in the SSCB, and the SSCB may share a single beam switching gap after the SSCB. The switching gaps may be provided between the SSCBs for different beams. The example 750 may provide that a first beam switching gap 762 is provided after a first SSCB 752 for a first beam and before a second SSCB 754 for a second beam, and that a second beam switching gap 764 is provided after the second SSCB 754 for the second beam.

Figures 8A, 8B:
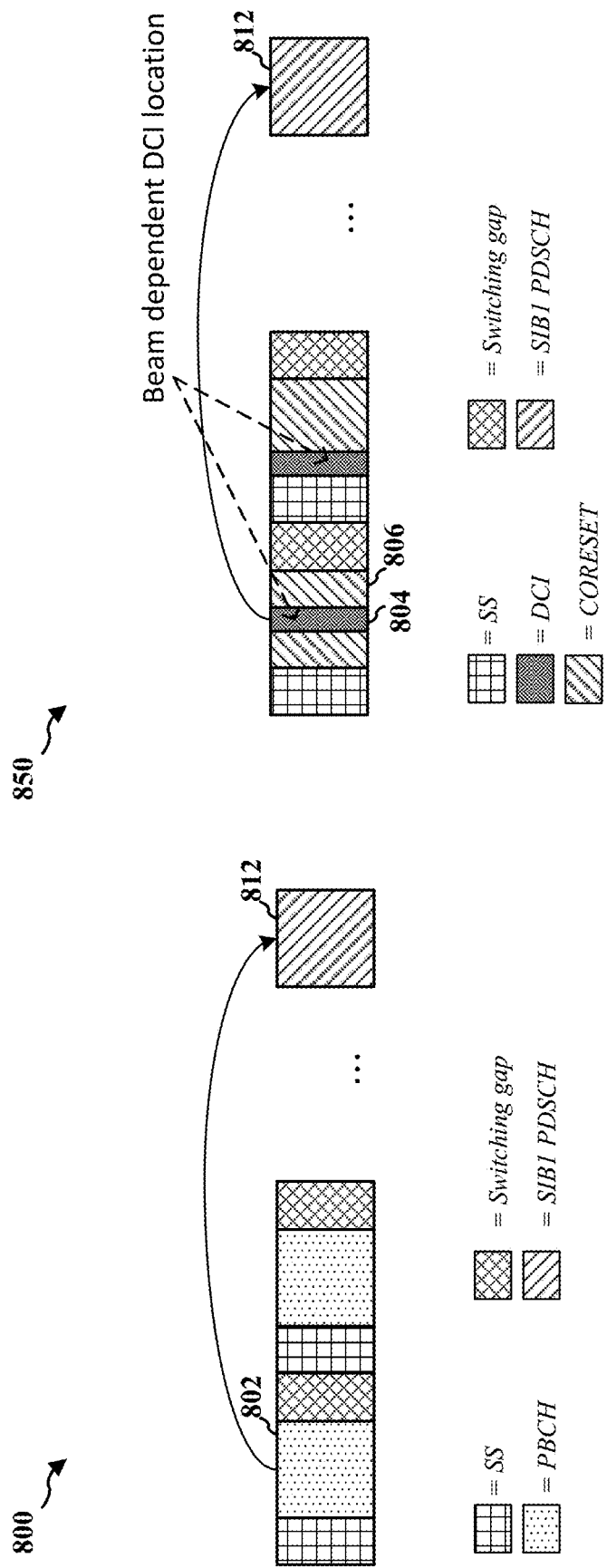
FIGS. 8A and 8B illustrate examples of an initial access structure of a method of wireless communication.

FIGS. 8A and 8B illustrate examples of an initial access structure of a method of wireless communication. In some aspects, the contents of PBCH/MIB and DCI 1_0 (with SI-RNTI) may be consolidated in a single message/channel to reduce the CRC overhead. That is, at least one channel/message structure that combines the information in both PBCH/MIB and DCI 1_0 with a CRC scrambled with SI-RNTI may be provided. Here, the combined information from the PBCH/MIB and DCI 1_0 may refer to as the initial access information message. FIG. 8A illustrates an example 800, including a PBCH 802 carrying the initial access information message. That is, the PBCH 802 may carry the scheduling information for the SIB1 PDSCH 812. FIG. 8B illustrates an example 850 that may carry the initial access information message using a message similar to DCI 804 using a PDCCH sent on a CORESET/search space 806. That is, the example 850 may include the CORESET 806 carrying the DCI 804 with the scheduling information for the SIB1 PDSCH 812.

Figure 9A:
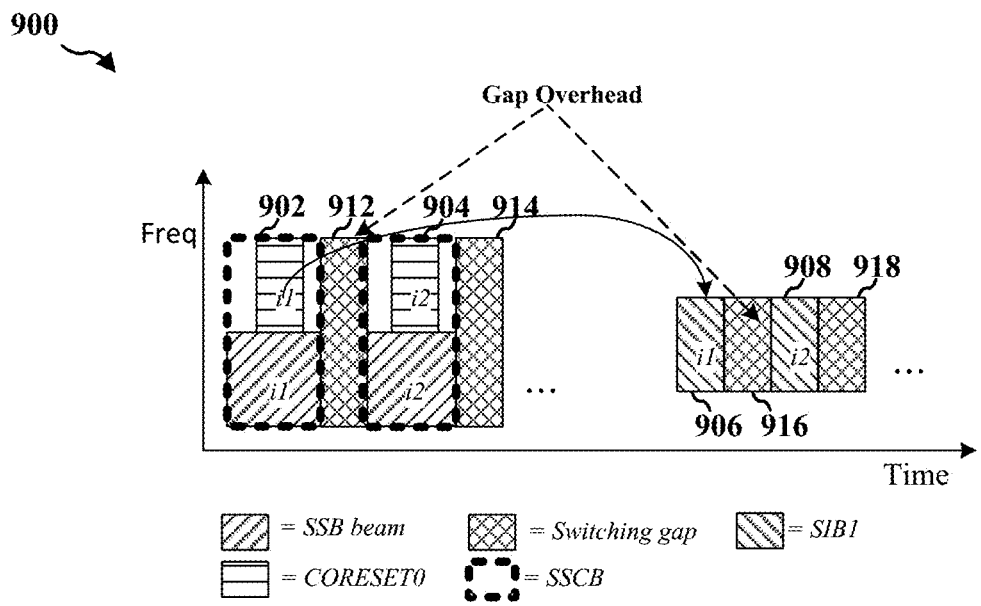
FIGS. 9A and 9B illustrate examples of an initial access structure of a method of wireless communication.
Figure 9B:
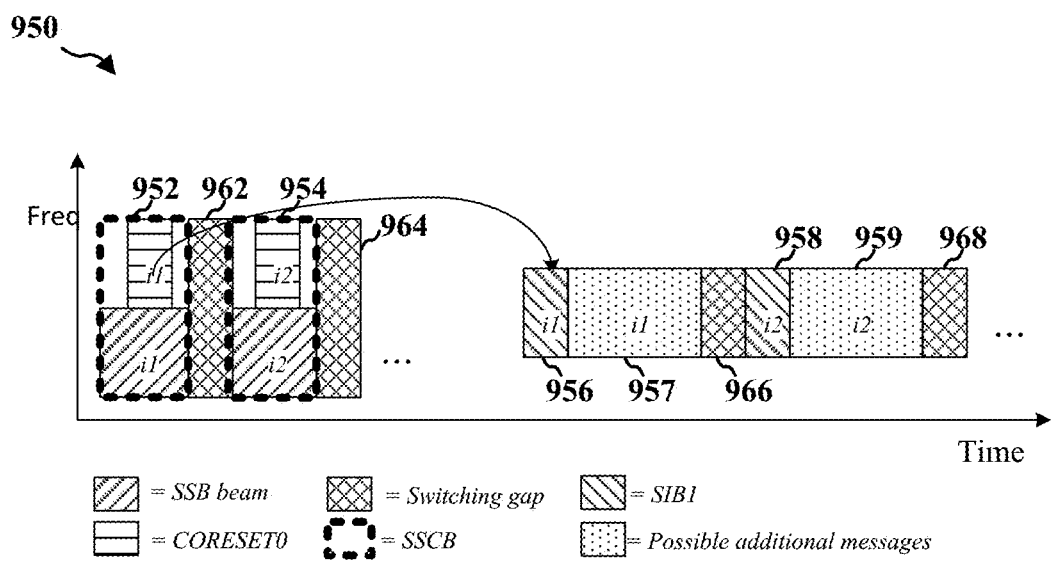

FIGS. 9A and 9B illustrate examples of an initial access structure of a method of wireless communication. FIG. 9A illustrates an example 900 including an SSCB including the SSB and the CORESET of the same beam frequency-division multiplexed in a single block. The SSB and the CORESET associated with the same beam may be included in the SSCB, and the SSCB may share a single beam switching gap after the SSCB. The switching gaps may be provided between the SSCBs for different beams. In some aspects, the CORESET may include CORESET0. The example 900 may provide that a first beam switching gap 912 is provided after a first SSCB 902 for a first beam and before a second SSCB 904 for a second beam and that a second beam switching gap 914 is provided after the second SSCB 904 for the second beam.

The CORESET0 of the SSCB may include the scheduling information of the corresponding SIB1 PDSCH. In some aspects, an additional beam switching gap may be provided between the SIB1 PDSCHs of different beams for beam switching. That is, the CORESET0 of the first SSCB 902 of the first beam may carry the scheduling information of the first SIB1 PDSCH 906 of the first beam, and a third beam-switching gap 916 may be provided after the first SIB1 PDSCH 906 and before a second SIB1 PDSCH 908. The CORESET0 of the second SSCB 904 of the second beam may carry the scheduling information of the second SIB1 PDSCH 908 of the second beam, and a fourth beam switching gap 918 may be provided after the second SIB1 PDSCH 908. Here, the SSB and the CORESET0 of the first SSCB 902 of the first beam may share the first beam switching gap 912; however, a third beam switching gap 916 is provided between the first SIB1 PDSCH 906 and the second SIB1 PDSCH 908 for beam switching.

FIG. 9B illustrates an example 950 including an SSCB including the SSB and the CORESET of the same beam frequency-division multiplexed in a single block. The SSB and the CORESET associated with the same beam may be included in the SSCB, and the SSCB may share a single beam switching gap after the SSCB. The switching gaps may be provided between the SSCBs for different beams. In some aspects, the CORESET may include CORESET0. The example 950 may provide that a first beam switching gap 962 is provided after a first SSCB 952 for a first beam and before a second SSCB 954 for a second beam and that a second beam switching gap 964 is provided after the second SSCB 954 for the second beam.

The CORESET0 of the SSCB may include the scheduling information of the corresponding SIB1 PDSCH. In some aspects, the network may schedule the beam SIB1 messages to have an additional spacing of time-frequency resources between different beams to allow for additional beam messages of the same beam to be scheduled in the additional spacing of time-frequency resources. That is, the PDSCH may include the SIB1 and the additional time-frequency resources for additional messages associated with the same beam. Accordingly, the SIB1 message and the additional messages associated with the same beam may share one beam switching gap. The additional beam switching gap may be provided between the PDSCHs of different beams for beam switching. That is, the CORESET0 of the first SSCB 952 of the first beam may carry the scheduling information of the first SIB1 PDSCH 956 of the first beam and a first additional message 957 of the first beam may be scheduled after the first SIB1 PDSCH 956. A third beam switching gap 966 may be provided after the additional message 957 and before a second SIB1 PDSCH 958. The CORESET0 of the second SSCB 954 of the second beam may carry the scheduling information of the second SIB1 PDSCH 958 of the second beam, and a second additional message 959 of the second beam may be scheduled after the second SIB1 PDSCH 959. A fourth beam switching gap 968 may be provided after the second additional message 959. Here, the SSB and the CORESET0 of the first SSCB 952 of the first beam may share the first beam switching gap 962; however, a third beam switching gap 966 may be provided between the first additional message 957 and the second SIB1 PDSCH 958 for beam switching.

Figure 10A:
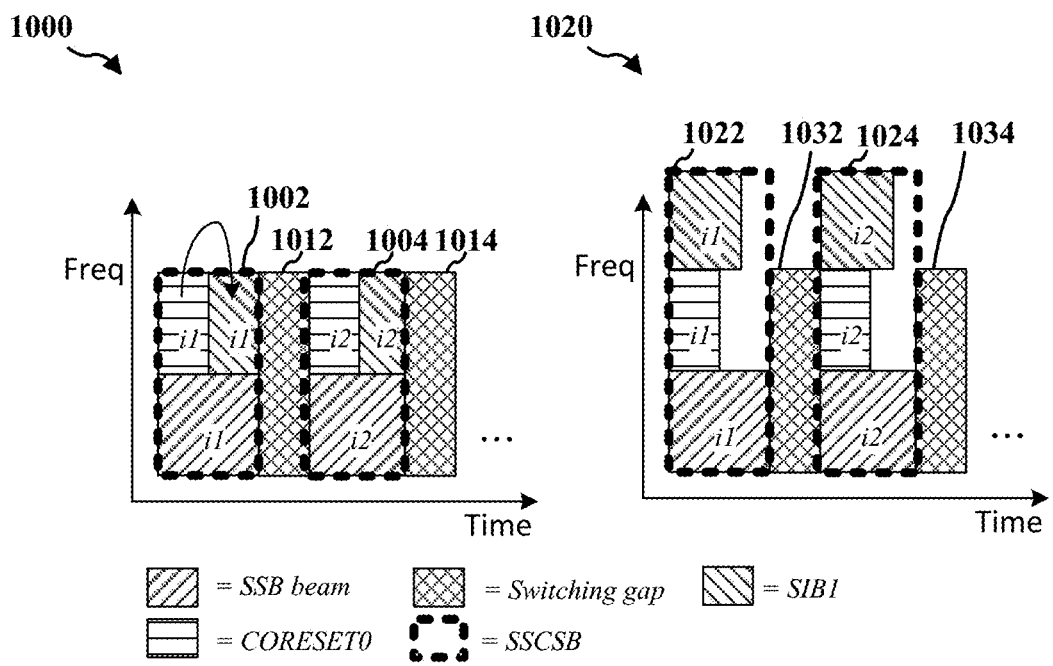
FIGS. 10A and 10B illustrate examples of an initial access structure of a method of wireless communication.
Figure 10B:
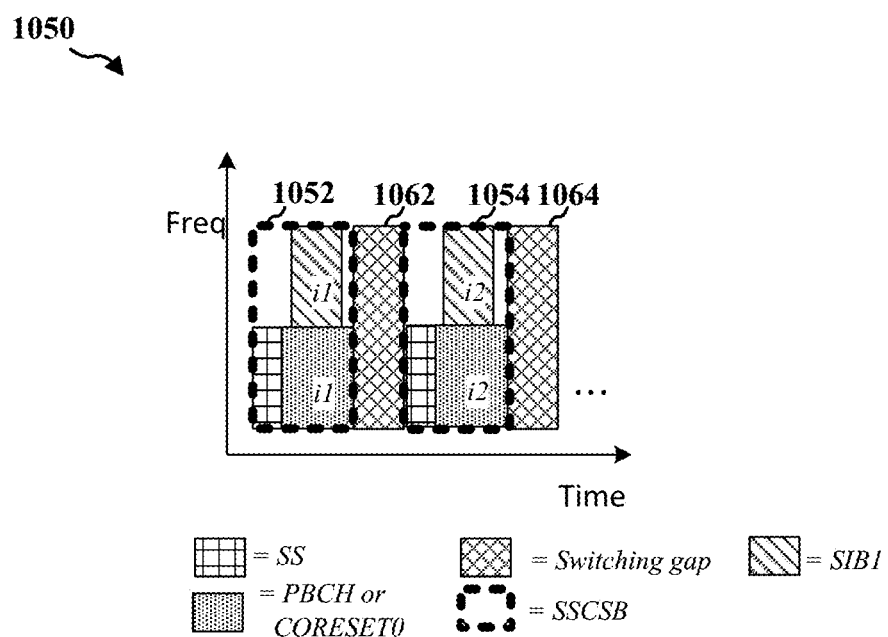

FIGS. 10A and 10B illustrate examples of an initial access structure of a method of wireless communication. FIGS. 10A and 10B provide an SSB/CORESET/SIB block (SSCSB) including at least one of the SS, the PBCH, the CORESET, and/or the SIB of the same beam in a single block.

FIG. 10A provides examples 1000 and 1020 of the SSCSB that may include the SIB frequency-division multiplexed with the SSB and/or the CORESET. In some aspects, the CORESET may include CORESET0, and the SIB may include SIB1. The first example 1000 illustrates that the SSCSB may include the SSB, the CORESET0 frequency-division multiplexed with the SSB, and the SIB1 frequency-division multiplexed with the SSB. That is, the first SSCSB 1002 may include a first SSB, a first CORESET0 frequency-division multiplexed with the first SSB, and a first SIB1 frequency-division multiplexed with the first SSB. The first SSB, the first CORESET0, and the first SIM may be associated with a first beam. The second SSCSB 1004 may include a second SSB, a second CORESET0 frequency-division multiplexed with the second SSB, and a second SIB1 frequency-division multiplexed with the second SSB. The second SSB, the second CORESET0, and the second SIM may be associated with a second beam.

In some aspects, the CORESET0 may carry the DCI 1_0 with SI-RNTI that includes the scheduling information of the SIB1, and the SIB1 may be time-division multiplexed with the CORESET0. The SSB, the CORESET0, and the SIB1 may be associated with the same beam, and the SSCSB may not include a beam switching gap. Each SSCSB may have one beam switching gap shared by the SSB, the CORESET0, and the SIM associated with the same beam. That is, a first beam switching gap 1012 may be provided between the first SSCSB 1002 and the second SSCSB 1004, and the second beam switching gap 1014 may be provided after the second SSCSB 1004.

The second example 1020 that the SSCSB may include the SSB, the CORESET0 frequency-division multiplexed with the SSB, and the SIB1 frequency-division multiplexed with the CORESET0. That is, the first SSCSB 1022 may include a first SSB, a first CORESET0 frequency-division multiplexed with the first SSB, and a first SIB1 frequency-division multiplexed with the first CORESET0. The first SSB, the first CORESET0, and the first SIB1 may be associated with a first beam. The second SSCSB 1024 may include a second SSB, a second CORESET0 frequency-division multiplexed with the second SSB, and a second SIB1 frequency-division multiplexed with the second CORESET0. The second SSB, the second CORESET0, and the second SIB1 may be associated with a second beam.

In some aspects, the CORESET0 may carry the DCI 1_0 with SI-RNTI that includes scheduling information of the SIB1, and the SIB1 may be frequency-division multiplexed with the CORESET0. The SSB, the CORESET0, and the SIB1 may be associated with the same beam, and the SSCSB may not include a beam switching gap. Each SSCSB may have one beam switching gap after the SSCSB shared by the SSB, the CORESET0, and the SIB1 associated with the same beam. That is, a first beam switching gap 1032 may be provided between the first SSCSB 1022 and the second SSCSB 1024, and the second beam switching gap 1034 may be provided after the second SSCSB 1024.

FIG. 10B illustrates an example 1050 of the SSCSB that may include the SIB frequency-division multiplexed with the SS and/or the PBCH or the CORESET. In some aspects, the CORESET may include CORESET0, and the SIB may include SIB1. The example 1050 illustrates that the SSCSB may include the SS, one of the PBCH or the CORESET0 time-division multiplexed with the SS, and the SIB1 frequency-division multiplexed with the SS and the one of the PBCH or the CORESET0. That is, the first SSCSB 1052 may include a first SS, a first PBCH/CORESET0 time-division multiplexed with the first SS, and a first SIB1 frequency-division multiplexed with the first PBCH/CORESET0. The first SS, the first CORESET0, and the first SIB1 may be associated with a first beam. The second SSCSB 1054 may include a second SS, a second PBCH/CORESET0 time-division multiplexed with the second SS, and a second SIB1 frequency-division multiplexed with the second PBCH/CORESET0. The second SS, the second CORESET0, and the second SIB1 may be associated with a second beam.

In some aspects, the PBCH/CORESET0 may include the scheduling information of the SIB1, and the SIB1 may be frequency-division multiplexed with the PBCH/CORESET0. In one aspect, the SSCSB may include CORESET0 that may carry the DCI including the scheduling information of the SIB1. In another aspect, the SSCSB may include the PBCH that may include the scheduling information of the SIB1. In another aspect, the SSCSB may include the PBCH, and the PBCH may not carry the scheduling information for the SIB1. In case the PBCH does not carry the scheduling information of the SIB1, the scheduling information for the SIB1 or one or more parameters of the SIB1 may be preconfigured.

In some aspects, the SS, the PBCH/CORESET0, and the SIB1 may be associated with the same beam, and the SSCSB may not include a beam switching gap. Each SSCSB may have one beam switching gap shared by the SS, the PBCH/CORESET0, and the SIB1 associated with the same beam. That is, a first beam switching gap 1062 may be provided between the first SSCSB 1052 and the second SSCSB 1054, and the second beam switching gap 1064 may be provided after the second SSCSB 1054.

In some aspects, the output waveforms for at least one of the SSB, the CORESET0, and/or the SIB1 may be the same as, or different from, each other. That is, the one or more waveforms for the SS and the PBCH may be the same as, or different from, one or more waveforms for at least one of the CORESET0 or the SIB1, and the one or more waveforms for the CORESET0 may be the same as, or different from, the one or more waveforms for the SIB1.

In some aspects, in the case of the DFT-s-OFDM or OFDM symbols, at least one of the frequency allocation, the BW, and/or the time duration of the CORESET0 may be specified or indicated in the MIB. That is, the base station may include at least one parameter of the CORESET0, such as the frequency allocation, the BW, and/or the time duration of the CORESET0 in the MIB. In one aspect, the BW of the CORESET0 may be different from the BW of the SSB.

FIGS. 10A and 10B provide examples 1000, 1020, and 1050 including SSCSB structures including at least one of the SSB/SS, PBCH, CORESET0, or SIB1 in certain orders. However, aspects of the present disclosure are not limited thereto, and the structure of the SSCSB may have various orders that may be applicable. In one aspect, the SSB may be provided after the CORESET0, and the beam switching gap may be provided after the SSB.

In some aspects, the SSCSB may have a mixed SCS used for the SSB/SS, CORESET0, and/or SIB1, and the SSB/SS CP may have a relatively long CP, e.g., based on the SCS being small enough, in order to absorb the beam switching gap. The beam switching may be absorbed by the CP, and separate time-frequency resources for the beam sweeping gap may be omitted.

Accordingly, the SSCSB of the examples 1000, 1020, and 1050 as illustrated in FIGS. 10A and 10B may provide the beam switching gap shared by the SS, the PBCH, the CORESET0, and the SIB1 of the same beam and reduce the signaling overhead from the additional beam switching gap.

Figures 11A, 11B:
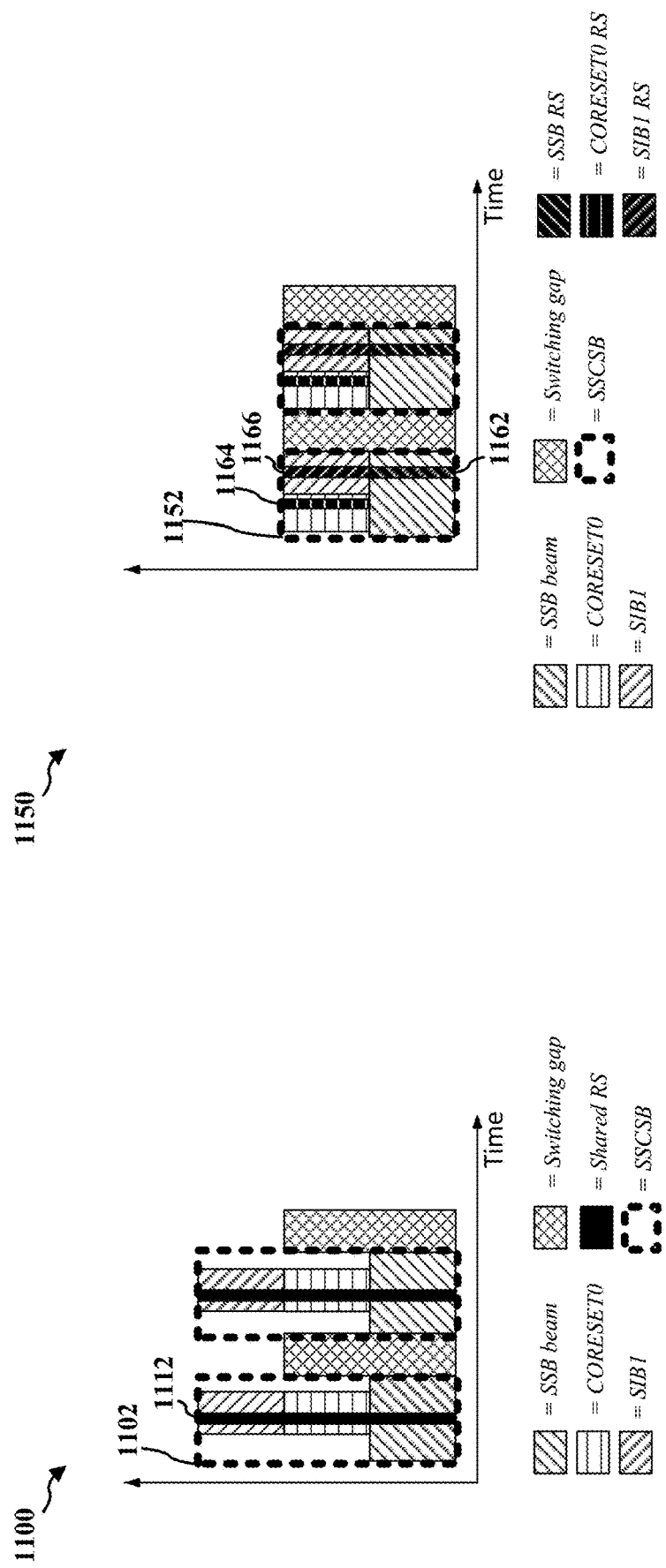
FIGS. 11A and 11B illustrate examples of an initial access structure of a method of wireless communication.

FIGS. 11A and 11B illustrate examples 1100 and 1150 of an initial access structure of a method of wireless communication. In some aspects, the examples 1100 and 1150 may include at least one reference signal (RS) for at least one of the SSB, the CORESET, or the SIB. Here, the RS may be a demodulation RS (DM-RS). In some aspects, the CORESET may include CORESET0 and the SIB may include SIB1. The UE may use the RS received from the base station to perform a channel estimation of the corresponding channel.

FIG. 11A illustrates the example 1100 including a shared RS shared by the SSB, the CORESET0, and/or the SIB1. That is, the shared RS may be provided to cover the total bandwidth of the SSCSB. In one aspect, the example 1100 provides that the first SSCSB 1102 may include a first SSB, a first CORESET0, and a first SIB1, where the first CORESET0 may be frequency-division multiplexed with the first SSB and the first SIB1 may be frequency-division multiplexed with the first CORESET0. The shared RS 1112 may be provided for the total bandwidth of the first SSCSB 1102. The UE may use the shared RS 1112 to perform channel estimation of the first SSCSB 1102. The shared RS 1112 may reduce the number of the time-frequency resources used for transmitting RSs for the channel estimation.

FIG. 11B illustrates the example 1150 including separate RSs specific for the SSB, the CORESET0, and/or the SIB1. That is, channel specific RSs may be provided for each component of the SSCSB, e.g., SSB/CORESET0/SIB1. In one aspect, the example 1150 provides that the first SSCSB 1152 may include a first SSB, a first CORESET0, and a first SIB1, where the first CORESET0 may be frequency-division multiplexed with the first SSB, and the first SIB1 may be frequency-division multiplexed with the first SSB and time-division multiplexed with the first CORESET0. An SSB RS 1162 may be provided for the first SSB, a CORESET0 RS may be provided for the first CORESET0, and/or a SIB1 RS may be provided for the first SIB1 RS. The UE may use the SSB RS 1162, the CORESET0 RS 1164, and/or the SIB1 RS 1166 to perform the channel estimation of the first SSB, the first CORESET0, and the SIB1, respectively. The channel specific RSs 1162, 1164, and 1166 may be used in case the bandwidths are different for each component of the SSCSB.

The UE may perform the channel estimation based on at least one decoded RS of an earlier channel of the SSCSB to decode a later channel of the SSCSB. That is, the UE may decode the SSCSB and the components of the SSCSB by performing channel estimation of at least one RS of the SSCSB, and the channel estimation may be at least partially based on the decoding result of the previous channels of the SSCSB. For example, the UE may refer to the CORESET0 decoded in the previous SSCSB to determine the BW of the SIB1 of the current SSCSB. The channel estimation may also be based on various parameters/information.

In one aspect, at least one BW of a certain channel may be preconfigured. For example, referring to FIG. 11A, the BW of the first SSB and the first CORESET0 of the first SSCSB 1102 may be preconfigured. The UE may perform the channel estimation of the shared RS 1112 to decode the SIB1 based on the channel estimation of the shared RS 1112 and the preconfigured BW of the first SSB and the first CORESET0 of the first SSCSB 1102.

In another aspect, the UE may blindly apply multiple BW options for the RS. That is, the UE and the base station may share a preconfigured set of multiple BW options for the RS, and the UE may blindly perform the channel estimation based on the preconfigured multiple BW options for the RS.

In another aspect, the BWs of at least one component/channel of the current SSCSB may be indicated in the RS of the earlier channel. That is, the UE may refer to the RS of the earlier channel to decode or perform channel estimation of at least one component/channel of the current SSCSB. For example, referring to FIG. 11A, the UE may perform the channel estimation of the shared RS 1112 to decode the SIB1 based on the channel estimation of the shared RS 1112 and refer to the previous SSCSB to determine that the BW of the first SSB and the BW of the first CORESET0 of the first SSCSB 1102 is the same as the BW of an SSB and the BW of a CORESET0 of a previous SSCSB. Accordingly, the UE may decode the SIB1 based on the channel estimation of the shared RS 1112 of the first SSCSB 1102 and the BW of the SSB, and the BW of the CORESET0 of the previous SSCSB.

In another aspect, the UE may use the portion of the BW that overlaps with the earlier channels. That is, the UE may decode the components/channels of the SSCSB based on the BW of the SSCSB that overlaps with the components/channels of the previously decoded SSCSB.

Figure 12A:
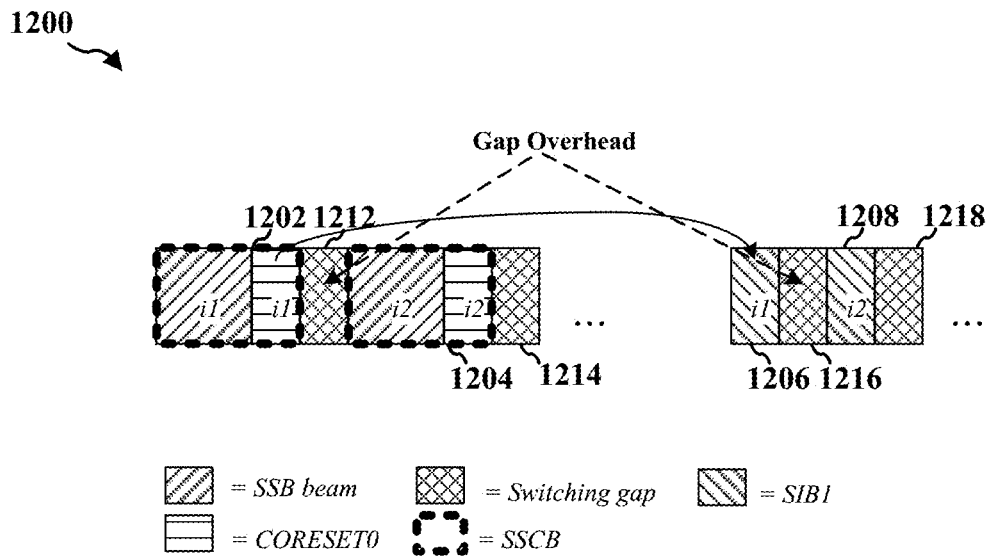
FIGS. 12A and 12B illustrate examples of an initial access structure of a method of wireless communication.
Figure 12B:
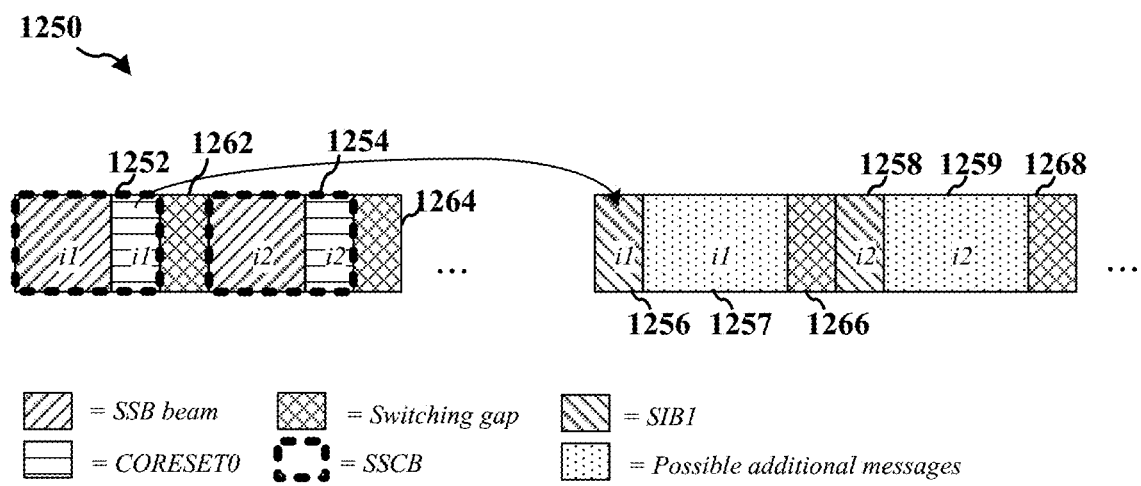

FIGS. 12A and 12B illustrate examples of an initial access structure of a method of wireless communication. FIG. 12A illustrates an example 1200 including an SSCB including the SSB and the CORESET of the same beam time-division multiplexed in a single block. In some aspects, the CORESET may include CORESET0. The SSB and the CORESET0 associated with the same beam may be included in the SSCB, and the SSCB may share a single beam switching gap after the SSCB. The switching gaps may be provided between the SSCBs for different beams. The example 1200 may provide that a first beam switching gap 1212 is provided after a first SSCB 1202 for a first beam and before a second SSCB 1204 for a second beam, and that a second beam switching gap 1214 is provided after the second SSCB 1204 for the second beam.

The CORESET0 of the SSCB may include the scheduling information of the corresponding SIB1 PDSCH. In some aspects, an additional beam switching gap may be provided between the SIB1 PDSCHs of different beams for beam switching. That is, the CORESET0 of the first SSCB 1202 of the first beam may carry the scheduling information of the first SIB1 PDSCH 1206 of the first beam, and a third beam switching gap 1216 may be provided after the first SIB1 PDSCH 1206 and before a second SIB1 PDSCH 1208. The CORESET0 of the second SSCB 1204 of the second beam may carry the scheduling information of the second SIB1 PDSCH 1208 of the second beam, and a fourth beam switching gap 1218 may be provided after the second SIB1 PDSCH 1208. Here, the SSB and the CORESET0 of the first SSCB 1202 of the first beam may share the first beam switching gap 1212; however, a third beam switching gap 1216 may be provided between the first SIB1 PDSCH 1206 and the second SIB1 PDSCH 1208 for beam switching.

FIG. 12B illustrates an example 1250 including an SSCB including the SSB and the CORESET of the same beam time-division multiplexed in a single block. In some aspects, the CORESET may include CORESET0. The SSB and the CORESET0 associated with the same beam may be included in the SSCB, and the SSCB may share a single beam switching gap after the SSCB. The switching gaps may be provided between the SSCBs for different beams. The example 1250 may provide that a first beam switching gap 1262 is provided after a first SSCB 1252 for a first beam and before a second SSCB 1254 for a second beam, and that a second beam switching gap 1264 is provided after the second SSCB 1254 for the second beam.

The CORESET0 of the SSCB may include the scheduling information of the corresponding SIB1 PDSCH. In some aspects, the network may schedule the beam SIB1 messages to have an additional spacing of time-frequency resources between different beams to allow for additional beam messages of the same beam to be scheduled in the additional spacing of time-frequency resources. That is, the PDSCH may include the SIB1 and the additional time-frequency resources for additional messages associated with the same beam. Accordingly, the SIB1 message and the additional messages associated with the same beam may share one beam switching gap. The additional beam switching gap may be provided between the PDSCHs of different beams for beam switching. That is, the CORESET0 of the first SSCB 1252 of the first beam may carry the scheduling information of the first SIB1 PDSCH 1256 of the first beam and a first additional message 1257 of the first beam may be scheduled after the first SIB1 PDSCH 1256. A third beam switching gap 1266 may be provided after the additional message 1257 and before a second SIB1 PDSCH 1258. The CORESET0 of the second SSCB 1254 of the second beam may carry the scheduling information of the second SIB1 PDSCH 1258 of the second beam, and a second additional message 1259 of the second beam may be scheduled after the second SIB1 PDSCH 1259. A fourth beam switching gap 1268 may be provided after the second additional message 1259. Here, the SSB and the CORESET0 of the first SSCB 1252 of the first beam may share the first beam switching gap 1262; however, a third beam switching gap 1266 may be provided between the first additional message 1257 and the second SIB1 PDSCH 1258 for beam switching.

Figure 13A:
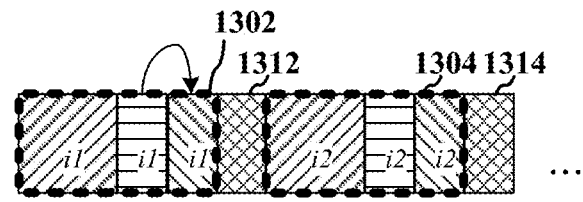
FIGS. 13A and 13B illustrate examples of an initial access structure of a method of wireless communication.
Figure 13B:
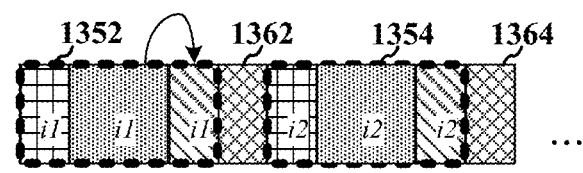

FIGS. 13A and 13B illustrate examples of an initial access structure of a method of wireless communication. FIGS. 13A and 13B provide an SSB/CORESET/SIB block (SSCSB) including at least one of the SS, the PBCH, the CORESET0, and/or the SIB1 of the same beam in a single block. In some aspects, the CORESET may include CORESET0, and the SIB may include SIB1.

FIG. 13A provides an example 1300 of the SSCSB that may include the SIB1 time-division multiplexed with the SSB and/or the CORESET0. The example 1300 illustrates that the SSCSB may include the SSB, the CORESET0 time-division multiplexed with the SSB, and the SIB1 time-division multiplexed with the CORESET0. That is, the first SSCSB 1302 may include a first SSB, a first CORESET0 time-division multiplexed with the first SSB, and a first SIB1 time-division multiplexed with the first CORESET0. The first SSB, the first CORESET0, and the first SIB1 may be associated with a first beam. The second SSCSB 1304 may include a second SSB, a second CORESET0 time-division multiplexed with the second SSB, and a second SIB1 time-division multiplexed with the second CORESET0. The second SSB, the second CORESET0, and the second SIB1 may be associated with a second beam.

In some aspects, the CORESET0 may carry the DCI 1_0 with SI-RNTI that includes the scheduling information of the SIB1, and the SIB1 may be time-division multiplexed with the CORESET0. The SSB, the CORESET0, and the SIB1 may be associated with the same beam, and the SSCSB may not include a beam switching gap. Each SSCSB may have one beam switching gap shared by the SSB, the CORESET0, and the SIB1 associated with the same beam. That is, a first beam switching gap 1312 may be provided between the first SSCSB 1302 and the second SSCSB 1304, and the second beam switching gap 1314 may be provided after the second SSCSB 1304.

FIG. 13B illustrates an example 1350 of the SSCSB that may include the SIB1 time-division multiplexed with the SS and/or the PBCH or the CORESET0. The example 1350 illustrates that the SSCSB may include the SS, one of the PBCH or the CORESET0 time-division multiplexed with the SS, and the SIB1 time-division multiplexed with the SS and one of the PBCH or the CORESET0. That is, the first SSCSB 1352 may include a first SS, a first PBCH/CORESET0 time-division multiplexed with the first SS, and a first SIB1 time-division multiplexed with the first PBCH/CORESET0. The first SS, the first CORESET0, and the first SIB1 may be associated with a first beam. The second SSCSB 1354 may include a second SS, a second PBCH/CORESET0 time-division multiplexed with the second SS, and a second SIM time-division multiplexed with the second PBCH/CORESET0. The second SS, the second CORESET0, and the second SIB1 may be associated with a second beam.

In some aspects, the PBCH/CORESET0 may include the scheduling information of the SIB1, and the SIB1 may be time-division multiplexed with the PBCH/CORESET0. In one aspect, the SSCSB may include CORESET0 that may carry the DCI that includes the scheduling information of the SIB1. In another aspect, the SSCSB may include the PBCH that may include the scheduling information of the SIB1. In another aspect, the SSCSB may include the PBCH, and the PBCH may not carry the scheduling information for the SIB1. In case the PBCH does not carry the scheduling information of the SIB1, the scheduling information for the SIB1 or one or more parameters of the SIB1 may be preconfigured.

In some aspects, the SS, the PBCH/CORESET0, and the SIB1 may be associated with the same beam, and the SSCSB may not include a beam switching gap. Each SSCSB may have one beam switching gap shared by the SS, the PBCH/CORESET0, and the SIB1 associated with the same beam. That is, a first beam switching gap 1362 may be provided between the first SSCSB 1352 and the second SSCSB 1354, and the second beam switching gap 1364 may be provided after the second SSCSB 1354.

In some aspects, the SS, the PBCH/CORESET0, and the SIB1 may be associated with the same beam, and the SSCSB may not include a beam switching gap. Each SSCSB may have one beam switching gap shared by the SS, the PBCH/CORESET0, and the SIB1 associated with the same beam. That is, a first beam switching gap 1362 may be provided between the first SSCSB 1352 and the second SSCSB 1354, and the second beam switching gap 1364 may be provided after the second SSCSB 1354.

In some aspects, the output waveforms for at least one of the SSB, the CORESET0, and/or the SIB1 may be the same as, or different from, each other. That is, the one or more waveforms for the SS and the PBCH may be the same as, or different from, one or more waveforms for at least one of the CORESET0 or the SIB1, and the one or more waveforms for the CORESET0 may be the same as, or different from, the one or more waveforms for the SIB1.

In some aspects, in the case of the DFT-s-OFDM or OFDM symbols, at least one of the frequency allocation, the BW, and/or the time duration of the CORESET0 may be specified or indicated in the MIB. That is, the base station may include at least one parameter of the CORESET0, such as the frequency allocation, the BW, and/or the time duration of the CORESET0 in the MIB. In one aspect, the BW of the CORESET0 may be different from the BW of the SSB.

FIGS. 13A and 13B provide examples 1300 and 1350, including SSCSB structures including at least one of the SSB/SS, PBCH, CORESET0, or SIB1 in certain orders. However, the aspects of the current disclosure are not limited thereto, and the structure of the SSCSB may have various orders that may be applicable. In one aspect, the SSB may be provided after the CORESET0, and the beam switching gap may be provided after the SSB.

Accordingly, the SSCSB of the examples 1300 and 1350, as illustrated in FIGS. 13A and 13B, may provide the beam switching gap shared by the SS, the PBCH, the CORESET0, and the SIB1 of the same beam and reduce the signaling overhead from the additional beam switching gap.

Figure 14A:
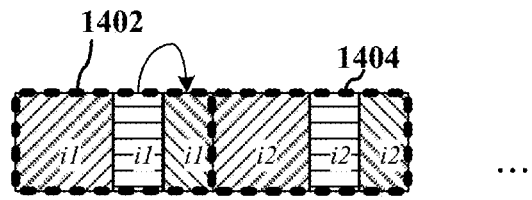
FIGS. 14A and 14B illustrate examples of an initial access structure of a method of wireless communication.
Figure 14B:
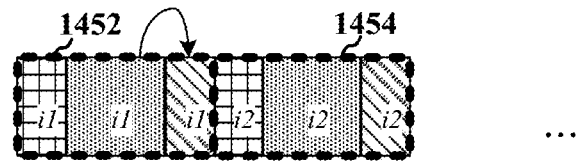

FIGS. 14A and 14B illustrate examples of an initial access structure of a method of wireless communication. The beam switching may occur between SSCSBs associated with different beams, and a beam switching gap may be provided between the SSCSBs associated with different beams. In some aspects, the SSCSB may have a mixed SCS for the SSB/SS, CORESET, and/or SIB, and the SSB/SS CP may have a relatively long CP, e.g., due to the SCS being small enough, to absorb the beam switching gap. The beam switching may be absorbed by the CP, and separate time-frequency resources for the beam sweeping gap may be omitted. In some aspects, the CORESET may include CORESET0, and the SIB may include SIB1.

FIG. 14A provides an example 1400 of the SSCSB that may include the SIB1 time-division multiplexed with one or more of SSB and/or the CORESET0. The example 1400 illustrates that the SSCSB may include the SSB, the CORESET0 time-division multiplexed with the SSB, and the SIB1 time-division multiplexed with the CORESET0. That is, the first SSCSB 1402 may include a first SSB, a first CORESET0 time-division multiplexed with the first SSB, and a first SIB1 time-division multiplexed with the first CORESET0. The first SSB, the first CORESET0, and the first SIB1 may be associated with a first beam. The second SSCSB 1404 may include a second SSB, a second CORESET0 time-division multiplexed with the second SSB, and a second SIB1 time-division multiplexed with the second CORESET0. The second SSB, the second CORESET0, and the second SIB1 may be associated with a second beam. The second SSB of the second SSCSB 1404 may have a relatively small SCS value and relatively long CP time to absorb the beam switching gap between the first SSCSB 1402 and the second SSCSB 1404. Accordingly, the beam switching gap between the first SSCSB 1402 and the second SSCSB 1404 may be absorbed in the CP of the second SSB of the second SSCSB 1404 and the first SSCSB 1402 and the second SSCSB 1404 may be scheduled without a beam switching gap in between.

FIG. 14B provides an example 1450 of the SSCSB that may include the SIB1 time-division multiplexed with the SS and/or the PBCH/CORESET0. The example 1450 illustrates that the SSCSB may include the SS, the PBCH/CORESET0 time-division multiplexed with the SS, and the SIB1 time-division multiplexed with the PBCH/CORESET0. That is, the first SSCSB 1452 may include a first SS, a first PBCH/CORESET0 time-division multiplexed with the first SS, and a first SIB1 time-division multiplexed with the first PBCH/CORESET0. The first SS, the first PBCH/CORESET0, and the first SIB1 may be associated with a first beam. The second SSCSB 1454 may include a second SS, a second PBCH/CORESET0 time-division multiplexed with the second SS, and a second SIB1 time-division multiplexed with the second PBCH/CORESET0. The second SS, the second PBCH/CORESET0, and the second SIB1 may be associated with a second beam. The second SS of the second SSCSB 1454 may have a relatively small SCS value and relatively long CP time to absorb the beam switching gap between the first SSCSB 1452 and the second SSCSB 1454. Accordingly, the beam switching gap between the first SSCSB 1452 and the second SSCSB 1454 may be absorbed in the CP of the second SS of the second SSCSB 1454 and the first SSCSB 1452 and the second SSCSB 1454 may be scheduled without a beam switching gap in between.

FIGS. 15A and 15B illustrate examples of an initial access structure of a method of wireless communication. In some aspects, the examples 1500 and 1550 may include at least one reference signal (RS) for at least one of the SSB, the CORESET, or the SIB. Here, the RS may be a demodulation RS (DM-RS). In some aspects, the CORESET may include CORESET0 and the SIB may include SIB1. The UE may use the RS received from the base station to perform channel estimation of the corresponding channel. FIG. 15A illustrates examples 1500 and 1520, including shared RSs shared by the SSB, the CORESET0, and/or the SIB1. That is, the SSB, the CORESET0, and/or the SIB1 may be time-division multiplexed.

In one aspect, the SSB, the CORESET0, and/or the SIB1 may have the same BW, and the shared RS may be provided for the BW of the SSB, the CORESET0, and/or the SIB1. Referring to the example 1500, the first SSCSB 1502 may include a first SSB, a first CORESET0, and a first SIB1, where the first CORESET0 may be time-division multiplexed with the first SSB, and the first SIB1 may be time-division multiplexed with the first CORESET0. The first shared RS 1512 of the first SSCSB 1502 may have a BW the same as the BW of the first SSB, the first CORESET0, and/or the first SIB1.

In another aspect, the SSB, the CORESET0, and/or the SIB1 may have different BWs, and the shared RS may follow the widest BW among the SSB, the CORESET0, and/or the SIB1. Referring to the example 1520, the second SSCSB 1522 may include a second SSB, a second CORESET0, and a second SIB1, where the second CORESET0 may be time-division multiplexed with the second SSB, and the second SIB1 may be time-division multiplexed with the second CORESET0. The second CORESET0 and the second SIB1 have the same BW that is greater than the BW of the first SSB. The second shared RS 1532 of the second SSCSB 1522 may have a BW the same as the BW of the second CORESET0 or the second SIB1, which is greater than the BW of the second SSB of the second SSCSB 1522.

In some aspects, an SSCSB having a shared RS may include at least one component/channel having different BW compared to another component/channel, and the UE may perform the channel estimation of the SSCSB based on at least one decoded RS of an earlier channel of the SSCSB to decode a later channel of the SSCSB. That is, the UE may decode the SSCSB and the components of the SSCSB by performing channel estimation of the shared RS of the SSCSB and further based at least partially on the decoding result of the previous channels of the SSCSB. For example, the UE may refer to the SSB decoded in the previous SSCSB to determine the BW of the SSB of the current SSCSB. The channel estimation may also be based on various parameters/information.

In one aspect, at least one BW of a certain channel may be preconfigured. For example, referring to FIG. 15B, the BW of the second SSB of the second SSCSB 1522 may be preconfigured. The UE may perform the channel estimation of the shared RS 1532 to decode the second SSB based on the preconfigured BW of the second SSB and perform the channel estimation of the shared RS 1532 to decode the second CORESET0 and the second SIB1 of the second SSCSB 1522.

In another aspect, the UE may blindly apply multiple BW options for the RS. That is, the UE and the base station may share a preconfigured set of multiple BW options for the RS, and the UE may blindly perform the channel estimation based on the preconfigured multiple BW options for the RS.

In another aspect, the BWs of at least one component/channel of the current SSCSB may be indicated in the RS of the earlier channel. That is, the UE may refer to the RS of the earlier channel to decode or perform channel estimation of at least one component/channel of the current SSCSB. For example, referring to FIG. 15B, the UE may perform the channel estimation of the shared RS 1532 to decode the second CORESET0 and the second SIB1 and perform the channel estimation of the second SSB based on the BW of the decoded SSB of a previous SSCSB.

In another aspect, the UE may use the portion of the BW that overlaps with the earlier channels. That is, the UE may decode the components/channels of the SSCSB based on the BW of the SSCSB that overlaps with the components/channels of the previously decoded SSCSB. For example, referring to FIG. 15B, the UE may decode the channel estimation of the second SSB of the second SSCSB 1522 by performing the channel estimation of the BW of the second SSCSB 1522 that overlaps the BW of the decoded SSB of the previous SSCSB.

FIG. 15B illustrates the example 1550 including separate RSs specific for the SSB, the CORESET0, and/or the SIB1. That is, channel specific RSs may be provided for each component of the SSCSB, e.g., SSB/CORESET0/SIB1. In one aspect, the example 1550 provides that the first SSCSB 1552 may include a first SSB, a first CORESET0, and a first SIB1, where the first CORESET0 may be time-division multiplexed with the first SSB, and the first SIB1 may be time-division multiplexed with the first CORESET0. An SSB RS 1562 may be provided for the first SSB, a CORESET0 RS may be provided for the first CORESET0, and/or a SIB1 RS may be provided for the first SIB1 RS. The UE may use the SSB RS 1562, the CORESET0 RS 1564, and/or the SIB1 RS 1566 to perform the channel estimation of the first SSB, the first CORESET0, and the SIB1, respectively. The channel specific RSs 1562, 1564, and 1566 may be used in case the bandwidths are different for each component of the SSCSB.

Figure 16A:
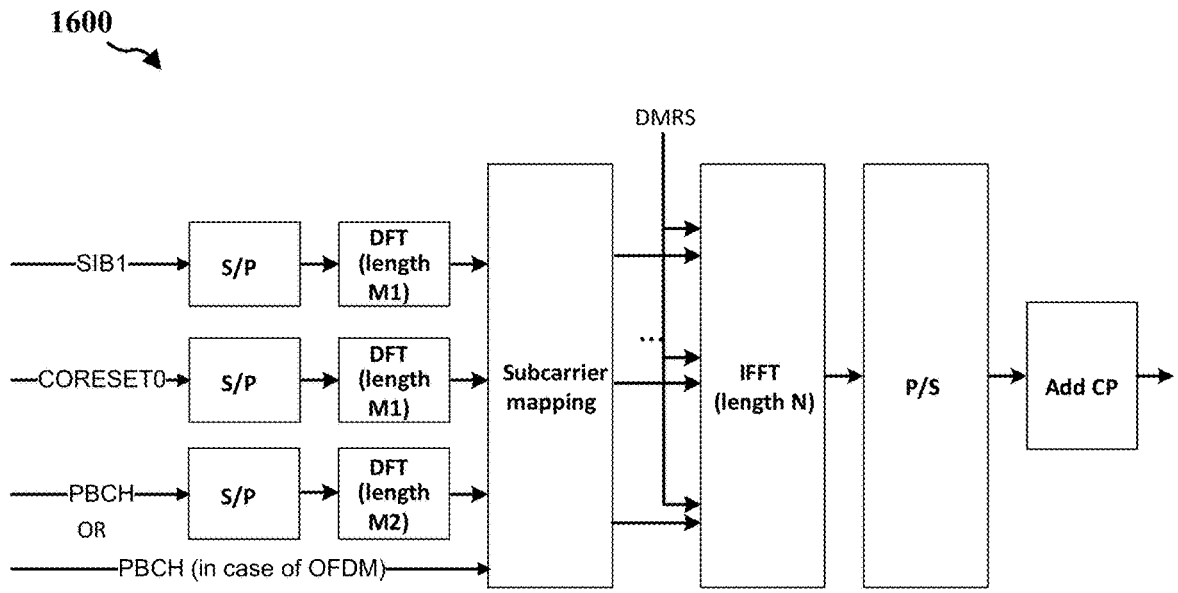
FIGS. 16A and 16B are examples of the RS for an initial access structure of a method of wireless communication.
Figure 16B:
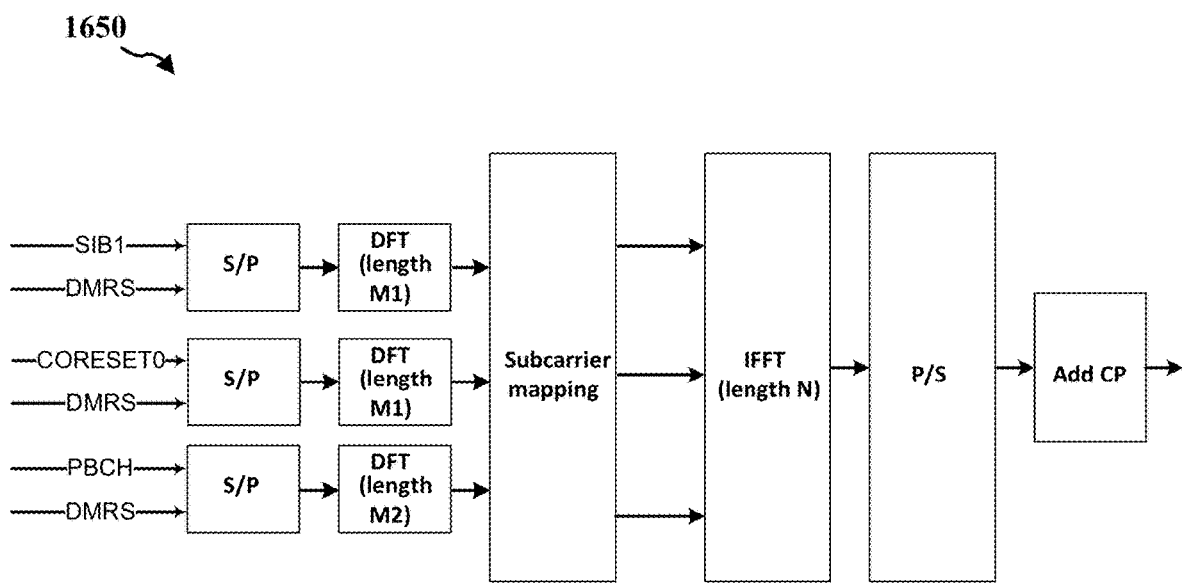

FIGS. 16A and 16B are examples of the RS for an initial access structure of a method of wireless communication. In some aspects, the various form of RS may be provided for the SSCSB. In one aspect, the RS may be FD symbols in dedicated DFT-s-OFDM symbols. The RS of the FD symbols in the dedicated DFT-s-OFDM symbols may support the FDE and have a higher signaling overhead.

In another aspect, the RS may be FD symbols inserted after DFT and before IFFT and sharing the same DFT-s-OFDM symbol as the data of the SSCSB. The RS of the FD symbols inserted after DFT and before IFFT may support the FDE, have increased PAPR, and have a smaller signaling overhead. FIG. 16A is an example 1600 providing that the FD symbols of the RS may be combined with the OFDM symbols of the SIB1, the CORESET0, and the PBCH using the IFFT to produce a physical channel carrying a time domain OFDM symbol stream.

In another aspect, the RS may be TD symbols inserted before DFT, sharing the same DFT-s-OFDM symbol as data of the SSCSB. The RS of the TD symbols inserted before the DFT may support a time domain equalization (TDE) and may have smaller signaling overhead. FIG. 16B is an example 1650 providing that the TD symbols of the RS may be combined with data streams of the SIB1, the CORESET0, and the PBCH, before the DFT and the subcarrier mapping of the DFT-s-OFDM symbols.

In some aspects, the components/channels of the SSCSB, i.e., SSB, CORESET0, and SIB1, may have different periodicities, and the UE may determine whether a channel is present in the SSCSB. The UE may determine the periodicities of the components/channels of the SSCSB based on various ways.

In some aspects, the UE may determine the presence of the components/channels of the SSCSB based on an indication from previous message/channel using information bits. In one aspect, the PBCH may indicate the UE of the presence of at least one of the DCI 1_0 and/or the CORESET0. In another aspect, the DCI 1_0 may indicate the UE of the presence of the SIB1.

In some aspects, the UE may determine the presence of the components/channels of the SSCSB based on the RS of the previous message/channel. In one aspect, the SS sequence may indicate the presence of a certain subsequent channel/message. In another aspect, the PBCH RS sequence may indicate the presence of at least one of the DCI 1_0 and/or the CORESET0. In another aspect, the PDCCH RS sequence may indicate the presence of the SIB1.

In some aspects, the UE may determine the presence of the components/channels of the SSCSB based on at least one preconfigured parameter. In one aspect, the UE may determine the presence of at least one components/channels of the SSCSB based on at least one preconfigured pattern. In another aspect, the presence of at least one components/channels of the SSCSB may be indicated (implicitly or explicitly) based on SFN/slot.

Figure 17:
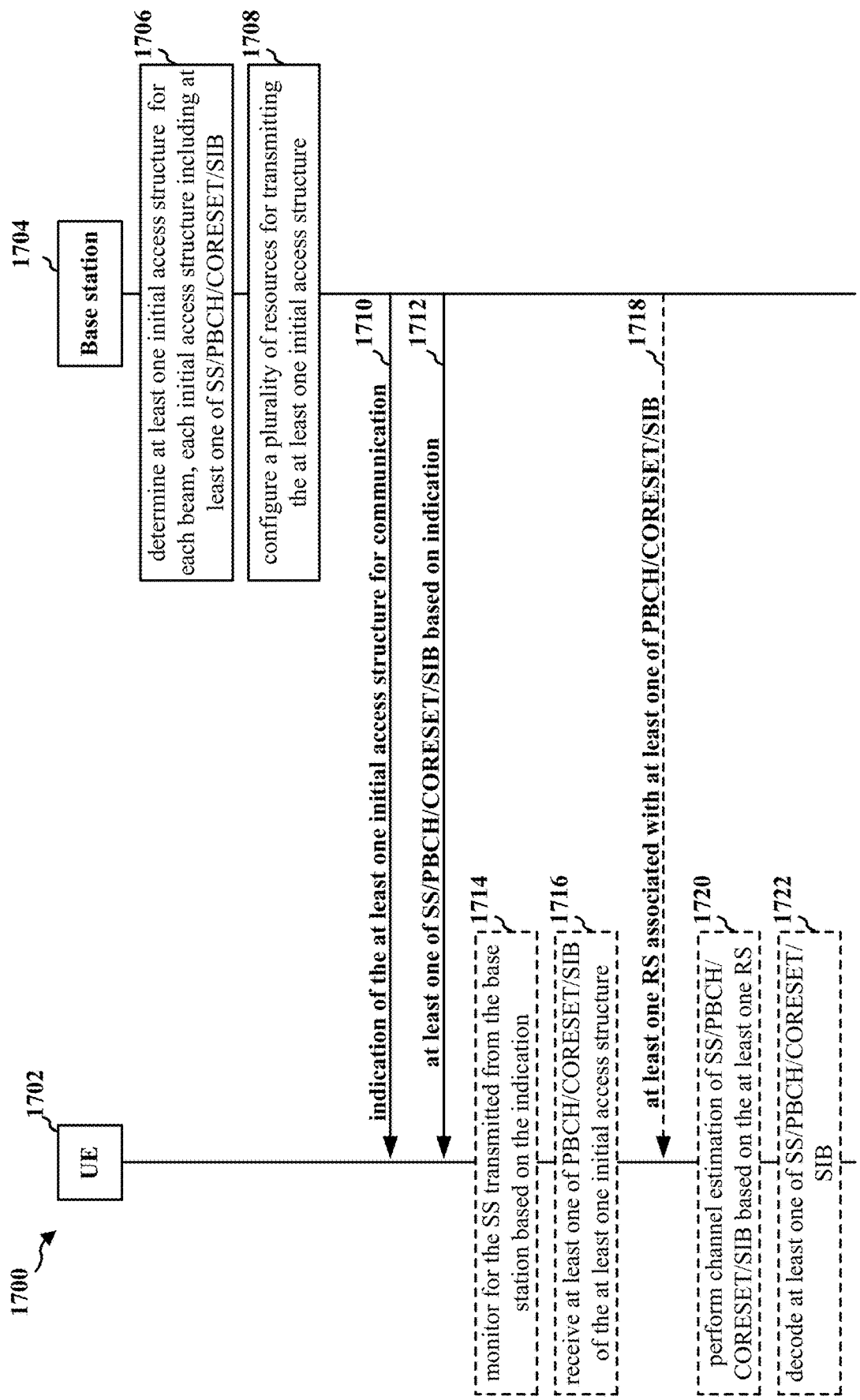
FIG. 17 is a communication diagram of a method of wireless communication.

FIG. 17 is a communication diagram 1700 of a method of wireless communication. The communication diagram 1700 may include a UE 1702 and a base station 1704.

At 1706, the base station may determine at least one initial access structure for each beam in a plurality of beams, each of the at least one initial access structure including at least one of an SS, a PBCH, a CORESET, or a SIB. In some aspects, the initial access structure may include an SSB/CORESET/SIB block (SSCSB) including at least one of the SS, the PBCH, the CORESET, and/or the SIB of the same beam in a single block. In some aspects, the CORESET may include CORESET0, and the SIB may include SIB1.

At 1708, the base station may configure a plurality of resources for transmitting at least one initial access structure. In some aspects, the SS may be time-division multiplexed with the PBCH and may be frequency-division multiplexed with the CORESET and the SIB, where the CORESET may carry scheduling information for the SIB. In one aspect, the CORESET is time-division multiplexed with the SIB. In another aspect, the CORESET may be frequency-division multiplexed with the SIB. In some cases, the PBCH may include a MIB indicating at least one of a frequency allocation, a bandwidth, or a time duration of the CORESET.

In some aspects, the SS may be time-division multiplexed with one of the PBCH or the CORESET and may be frequency-division multiplexed with the SIB, where the one of the PBCH or the CORESET carries scheduling information for the SIB. In some aspects, the scheduling information for the SIB or one or more SIB parameters may be preconfigured.

At 1710, the base station may transmit, to the UE, an indication of at least one initial access structure for each beam in a plurality of beams, the initial access structure including at least one of the SS, the PBCH, the CORESET, or the SIB. The UE may receive, from the base station, the indication of at least one initial access structure for each beam in the plurality of beams, the initial access structure including at least one of the SS, the PBCH, the CORESET, or the SIB. In one aspect, the indication may be associated with at least one of the CORESET or the SIB.

At 1712, the base station may transmit at least one of the SS, the PBCH, the CORESET, or the SIB to the UE, via the plurality of resources based on the indication of at least one initial access structure. The UE may receive at least one of the SS, the PBCH, the CORESET, or the SIB from the base station, via the plurality of resources based on the indication of at least one initial access structure.

At 1714, the UE may monitor for the SS transmitted from the base station based on the indication of at least one initial access structure for each beam in the plurality of beams. At 1716, the UE may receive at least one of the PBCH, the CORESET, or the SIB of at least one initial access structure.

In some aspects, at least one switching gap may be configured after at least one initial access structure, the at least one switching gap being configured based on an SCS. In one aspect, at least one switching gap may be configured within a CP of the at least one initial access structure based on an inverse of a subcarrier spacing (SCS) for the SS being greater than or equal to a threshold gap value.

In some aspects, one or more waveforms for the SS and the PBCH may be the same as or different from one or more waveforms for at least one of the CORESET or the SIB, and the one or more waveforms for the CORESET may be the same as or different from the one or more waveforms for the SIB.

At 1718, the base station may transmit, to the UE, at least one reference signal associated with at least one of the PBCH, the CORESET, or the SIB. The UE may receive, from the base station, at least one reference signal associated with at least one of the PBCH, the CORESET, or the SIB. In some aspects, the at least one reference signal may include a shared RS associated with at least one of the PBCH, the CORESET, or the SIB.

In one aspect, the least one reference signal may include one or more frequency domain symbols in a dedicated DFT-s-OFDM symbol. In another aspect, at least one reference signal may include one or more frequency domain symbols subsequent to the determination of at least one initial access structure. In another aspect, at least one reference signal may include one or more time domain symbols prior to the determination of at least one initial access structure.

At 1720, the UE may perform channel estimation of at least one of the SS, the PBCH, the CORESET, or the SIB based on at least one reference signal. In one aspect, a frequency bandwidth of at least one of the SS, the PBCH, the CORESET, or the SIB may be preconfigured. In another aspect, the channel estimation of at least one of the SS, the PBCH, the CORESET, or the SIB is may be performed based on a list of bandwidth candidates for at least one reference signal. In another aspect, a frequency bandwidth of at least one of the SS, the PBCH, the CORESET, or the SIB may be indicated in a reference signal of a preceding channel of at least one of the SS, the PBCH, the CORESET, or the SIB. In another aspect, the channel estimation of at least one of the SS, the PBCH, the CORESET, or the SIB may be performed based on a frequency bandwidth of a preceding channel of at least one of the SS, the PBCH, the CORESET, or the SIB.

At 1722, the UE may decode at least one of the SS, the PBCH, the CORESET, or the SIB based on the performed channel estimation. In one aspect, at least one of an SS, a PBCH, a CORESET, or a SIB of a previous initial access structure may indicate a periodicity of at least one initial access structure. In another aspect, at least one reference signal of a previous initial access structure may indicate a periodicity of at least one initial access structure. In another aspect, a periodicity of at least one of the SS, the PBCH, the CORESET, or the SIB may be configured with at least one pattern or configured based on an SFN or at least one slot.

Figure 18:
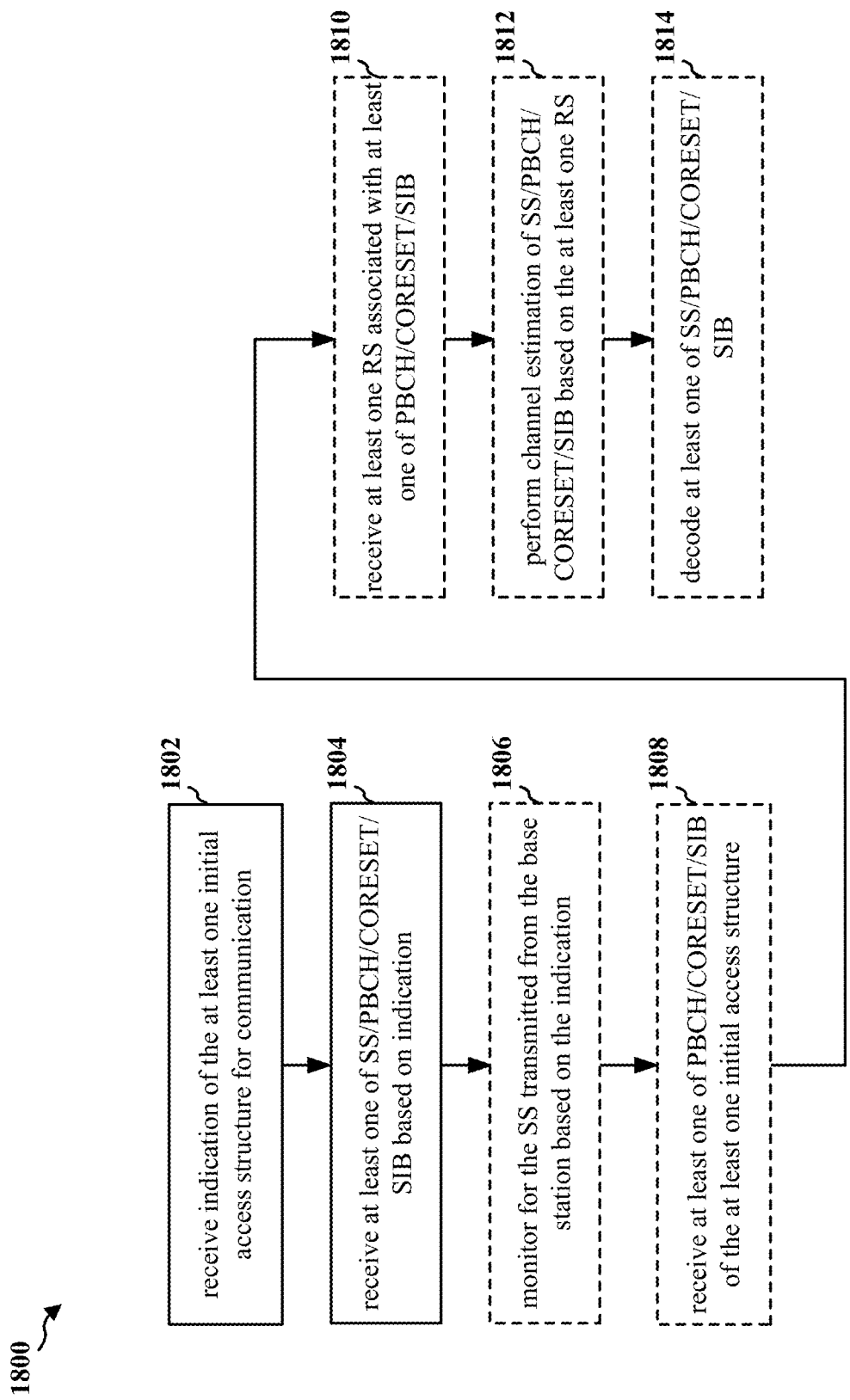
FIG. 18 is a flowchart of a method of wireless communication.

FIG. 18 is a flowchart 1800 of a method of wireless communication. The method may be performed by a UE (e.g., the UE 104/1702; the apparatus 2002).

At 1802, the UE may be configured to receive, from the base station, the indication of at least one initial access structure for each beam in the plurality of beams, the initial access structure including at least one of the SS, the PBCH, the CORESET, or the SIB. In one aspect, the indication may be associated with at least one of the CORESET or the SIB In some aspects, the initial access structure may include an SSB/CORESET/SIB block (SSCSB) including at least one of the SS, the PBCH, the CORESET, and/or the SIB of the same beam in a single block. In some aspects, the CORESET may include CORESET0, and the SIB may include SIB1. For example, 1802 may be performed by an initial access information processing component 2040.

At 1804, the UE may be configured to receive at least one of the SS, the PBCH, the CORESET, or the SIB from the base station, via the plurality of resources based on the indication of at least one initial access structure. In some aspects, the SS may be time-division multiplexed with the PBCH and may be frequency-division multiplexed with the CORESET and the SIB, where the CORESET may carry scheduling information for the SIB. In one aspect, the CORESET is time-division multiplexed with the SIB. In another aspect, the CORESET may be frequency-division multiplexed with the SIB. In some cases, the PBCH may include a MIB indicating at least one of a frequency allocation, a bandwidth, or a time duration of the CORESET. In some aspects, the SS may be time-division multiplexed with one of the PBCH or the CORESET and may be frequency-division multiplexed with the SIB, where the one of the PBCH or the CORESET carries scheduling information for the SIB. In some aspects, the scheduling information for the SIB or one or more SIB parameters may be preconfigured. For example, 1804 may be performed by the initial access information processing component 2040.

At 1806, the UE may be configured to monitor for the SS transmitted from the base station based on the indication of at least one initial access structure for each beam in the plurality of beams. For example, 1806 may be performed by an SS monitoring component 2042. At 1808, the UE may be configured to receive at least one of the PBCH, the CORESET, or the SIB of at least one initial access structure. For example, 1808 may be performed by the initial access information processing component 2040.

In some aspects, at least one switching gap may be configured after at least one initial access structure, the at least one switching gap being configured based on an SCS. In one aspect, at least one switching gap may be configured within a CP of the at least one initial access structure based on an inverse of a subcarrier spacing (SCS) for the SS being greater than or equal to a threshold gap value.

In some aspects, one or more waveforms for the SS and the PBCH may be the same as or different from one or more waveforms for at least one of the CORESET or the SIB, and the one or more waveforms for the CORESET may be the same as or different from the one or more waveforms for the SIB.

At 1810, the UE may be configured to receive, from the base station, at least one reference signal associated with at least one of the PBCH, the CORESET, or the SIB. In some aspects, the at least one reference signal may include a shared RS associated with at least one of the PBCH, the CORESET, or the SIB. In one aspect, the least one reference signal may include one or more frequency domain symbols in a dedicated DFT-s-OFDM symbol. In another aspect, at least one reference signal may include one or more frequency domain symbols subsequent to the determination of at least one initial access structure. In another aspect, at least one reference signal may include one or more time domain symbols prior to the determination of at least one initial access structure. For example, 1810 may be performed by a DL channel estimation component 2044.

At 1812, the UE may be configured to perform channel estimation of at least one of the SS, the PBCH, the CORESET, or the SIB based on at least one reference signal. In one aspect, a frequency bandwidth of at least one of the SS, the PBCH, the CORESET, or the SIB may be preconfigured. In another aspect, the channel estimation of at least one of the SS, the PBCH, the CORESET, or the SIB may be performed based on a list of bandwidth candidates for at least one reference signal. In another aspect, a frequency bandwidth of at least one of the SS, the PBCH, the CORESET, or the SIB may be indicated in a reference signal of a preceding channel of at least one of the SS, the PBCH, the CORESET, or the SIB. In another aspect, the channel estimation of at least one of the SS, the PBCH, the CORESET, or the SIB may be performed based on a frequency bandwidth of a preceding channel of at least one of the SS, the PBCH, the CORESET, or the SIB. For example, 1812 may be performed by the DL channel estimation component 2044.

At 1814, the UE may be configured to decode at least one of the SS, the PBCH, the CORESET, or the SIB based on the performed channel estimation. In one aspect, at least one of an SS, a PBCH, a CORESET, or a SIB of a previous initial access structure may indicate a periodicity of at least one initial access structure. In another aspect, at least one reference signal of a previous initial access structure may indicate a periodicity of at least one initial access structure. In another aspect, a periodicity of at least one of the SS, the PBCH, the CORESET, or the SIB may be configured with at least one pattern or configured based on an SFN or at least one slot. For example, 1814 may be performed by a DL channel decoding component 2046.

Figure 19:
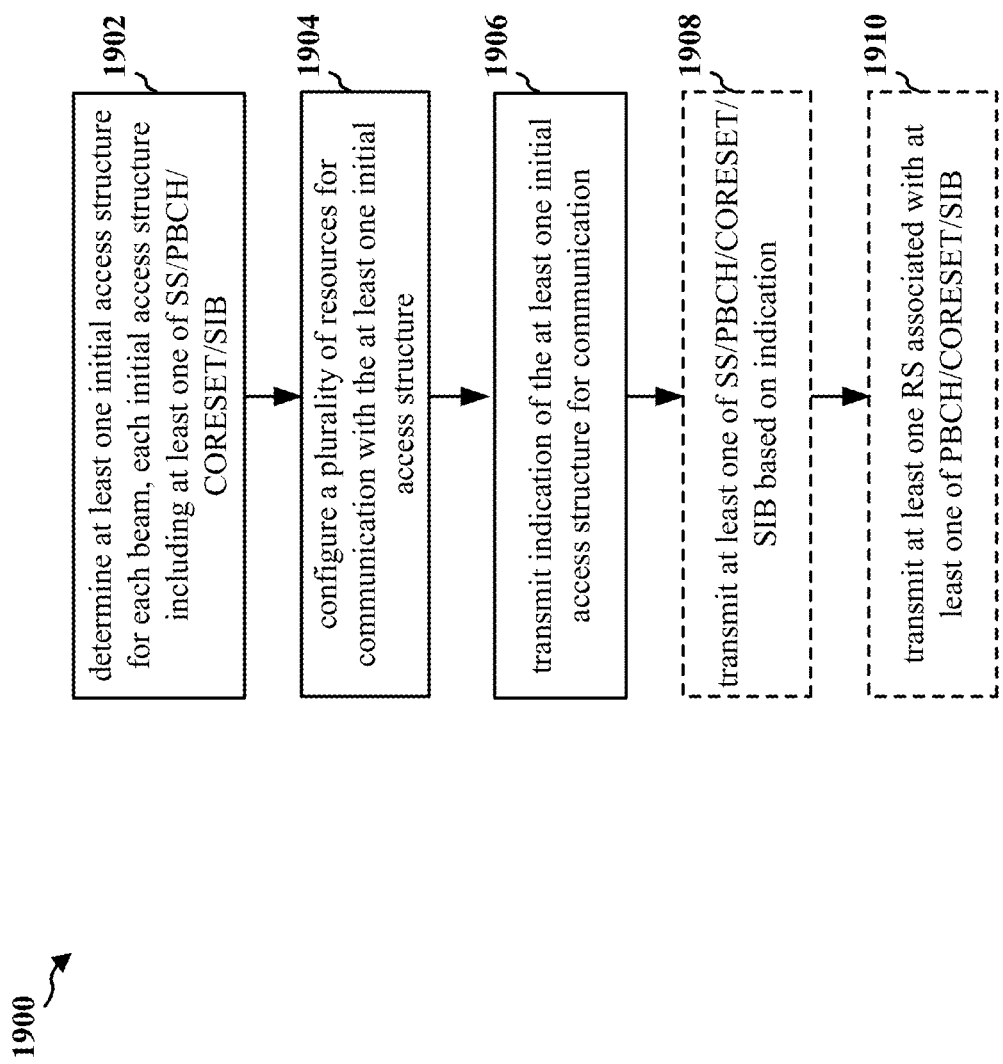
FIG. 19 is a flowchart of a method of wireless communication.

FIG. 19 is a flowchart 1900 of a method of wireless communication. The method may be performed by a base station (e.g., the base station 102/180/1704; the apparatus 2102.

At 1902, the base station may be configured to determine at least one initial access structure for each beam in a plurality of beams, each of the at least one initial access structure including at least one of an SS, a PBCH, a CORESET, or a SIB. In some aspects, the initial access structure may include an SSB/CORESET/SIB block (SS-CSB) including at least one of the SS, the PBCH, the CORESET, and/or the SIB of the same beam in a single block. In some aspects, the CORESET may include CORESET0, and the SIB may include SIB1. For example, 1902 may be performed by an initial access information managing component 2140.

At 1904, the base station may configure a plurality of resources for transmitting at least one initial access structure. In some aspects, the SS may be time-division multiplexed with the PBCH and may be frequency-division multiplexed with the CORESET and the SIB, where the CORESET may carry scheduling information for the SIB. In one aspect, the CORESET is time-division multiplexed with the SIB. In another aspect, the CORESET may be frequency-division multiplexed with the SIB. In some cases, the PBCH may include a MIB indicating at least one of a frequency allocation, a bandwidth, or a time duration of the CORESET. In some aspects, the SS may be time-division multiplexed with one of the PBCH or the CORESET and may be frequency-division multiplexed with the SIB, where the one of the PBCH or the CORESET carries scheduling information for the SIB. In some aspects, the scheduling information for the SIB or one or more SIB parameters may be preconfigured. For example, 1904 may be performed by a DL resource managing component 2142.

At 1906, the base station may be configured to transmit, to the UE, an indication of at least one initial access structure for each beam in a plurality of beams, the initial access structure including at least one of the SS, the PBCH, the CORESET, or the SIB. In one aspect, the indication may be associated with at least one of the CORESET or the SIB. For example, 1906 may be performed by the initial access information managing component 2140.

At 1908, the base station may be configured to transmit at least one of the SS, the PBCH, the CORESET, or the SIB to the UE, via the plurality of resources based on the indication of at least one initial access structure. For example, 1908 may be performed by a DL transmission component 2144.

At 1910, the base station may be configured to transmit, to the UE, at least one reference signal associated with at least one of the PBCH, the CORESET, or the SIB. In some aspects, the at least one reference signal may include a shared RS associated with at least one of the PBCH, the CORESET, or the SIB. In one aspect, the least one reference signal may include one or more frequency domain symbols in a dedicated DFT-s-OFDM symbol. In another aspect, at least one reference signal may include one or more frequency domain symbols subsequent to the determination of at least one initial access structure. In another aspect, at least one reference signal may include one or more time domain symbols prior to the determination of at least one initial access structure. For example, 1910 may be performed by the DL transmission component 2144.

Figure 20:
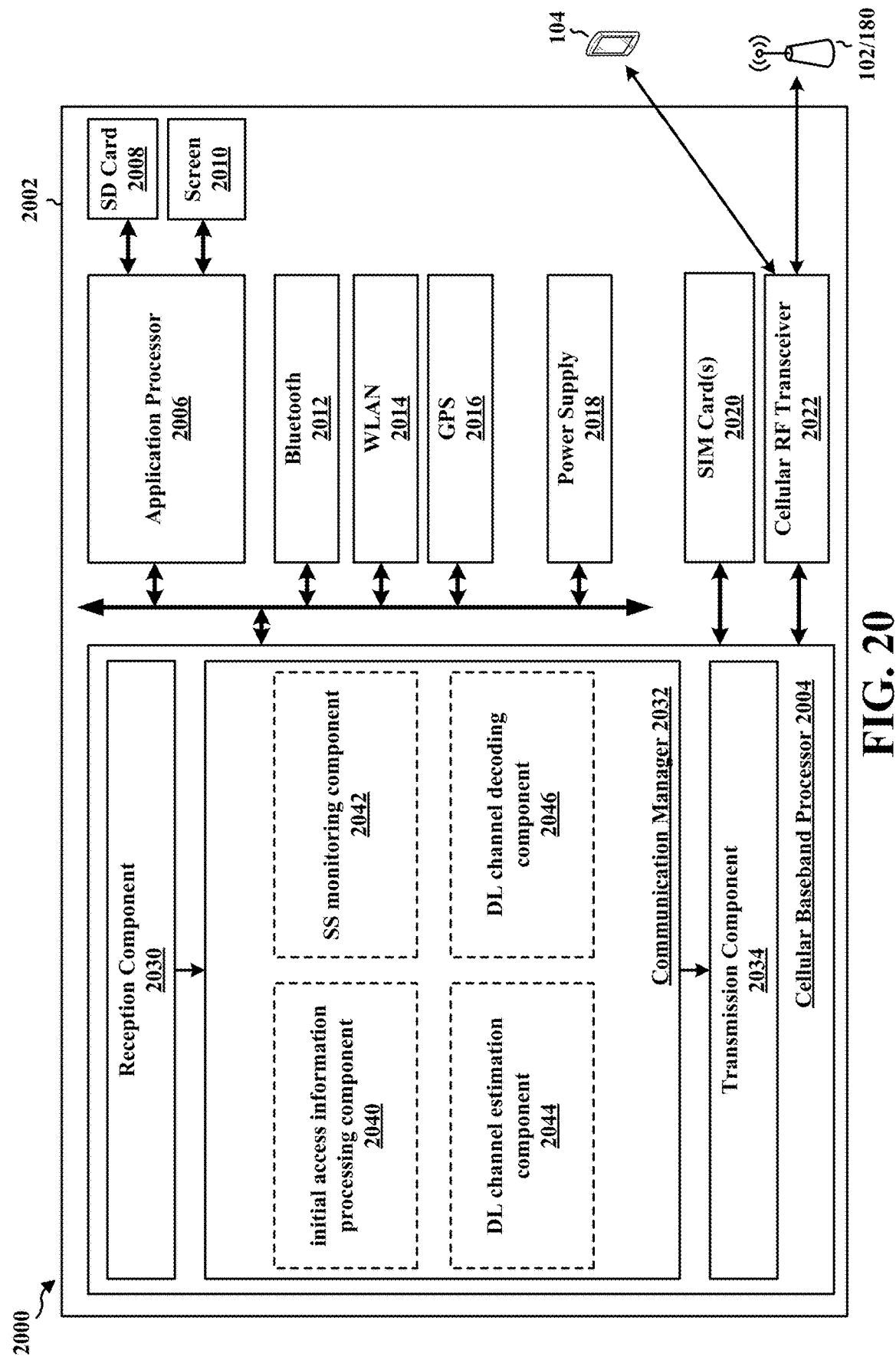
FIG. 20 is a diagram illustrating an example of a hardware implementation for an example apparatus.

FIG. 20 is a diagram 2000 illustrating an example of a hardware implementation for an apparatus 2002. The apparatus 2002 is a UE and includes a cellular baseband processor 2004 (also referred to as a modem) coupled to a cellular RF transceiver 2022 and one or more subscriber identity modules (SIM) cards 2020, an application processor 2006 coupled to a secure digital (SD) card 2008 and a screen 2010, a Bluetooth module 2012, a wireless local area network (WLAN) module 2014, a Global Positioning System (GPS) module 2016, and a power supply 2018. The cellular baseband processor 2004 communicates through the cellular RF transceiver 2022 with the UE 104 and/or BS 102/180. The cellular baseband processor 2004 may include a computer-readable medium/memory. The computer-readable medium/memory may be non-transitory. The cellular baseband processor 2004 is responsible for general processing, including the execution of software stored on the computer-readable medium/memory. The software, when executed by the cellular baseband processor 2004, causes the cellular baseband processor 2004 to perform the various functions described supra. The computer-readable medium/ memory may also be used for storing data that is manipulated by the cellular baseband processor 2004 when executing software. The cellular baseband processor 2004 further includes a reception component 2030, a communication manager 2032, and a transmission component 2034. The communication manager 2032 includes the one or more illustrated components. The components within the communication manager 2032 may be stored in the computer-readable medium/memory and/or configured as hardware within the cellular baseband processor 2004. The cellular baseband processor 2004 may be a component of the UE 350 and may include the memory 360 and/or at least one of the TX processor 368, the RX processor 356, and the controller/ processor 359. In one configuration, the apparatus 2002 may be a modem chip and include just the baseband processor 2004, and in another configuration, the apparatus 2002 may be the entire UE (e.g., see 350 of FIG. 3) and include the aforediscussed additional modules of the apparatus 2002.

The communication manager 2032 includes an initial access information processing component 2040 that is configured to receive the indication of at least one initial access structure, receive at least one of the SS, the PBCH, the CORESET, or the SIB based on the indication, receive the at least one of the PBCH, the CORESET, or the SIB of the at least one initial access structure, e.g., as described in connection with 1802, 1804, and 1808. The communication manager 2032 includes an SS monitoring component 2042 that is configured to monitor for the SS transmitted from the base station based on the indication, e.g., as described in connection with 1806. The communication manager 2032 includes a DL channel estimation component 2044 that is configured to receive at least one RS associated with at least one of the PBCH, the CORESET, or the SIB, and perform channel estimation of at least one of the SS, the PBCH, the CORESET, e.g., as described in connection with 1810 and 1812. The communication manager 2032 includes a DL channel decoding component 2046 that is configured to decode at least one of the SS, the PBCH, the CORESET, or the SIB, e.g., as described in connection with 1814.

The apparatus may include additional components that perform each of the blocks of the algorithm in the aforementioned flowcharts of FIGS. 17 and 18. As such, each block in the aforementioned flowcharts of FIGS. 17 and 18 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 2002, and in particular the cellular baseband processor 2004, includes means for determining at least one initial access structure for each beam in a plurality of beams, each of the at least one initial access structure including at least one of an SS, a PBCH, a CORESET, or a SIB, means for configuring a plurality of resources for transmitting the at least one initial access structure, and means for transmitting, to a UE, an indication of the at least one initial access structure for transmitting via the plurality of resources. The apparatus 2002 includes means for transmitting, to the UE, at least one of the SS, the PBCH, the CORESET, or the SIB, via the plurality of resources based on the indication of at least one initial access structure. The apparatus 2002 includes means for transmitting, to the UE, at least one reference signal associated with at least one of the PBCH, the CORESET, or the SIB. The aforementioned means may be one or more of the aforementioned components of the apparatus 2002 configured to perform the functions recited by the aforementioned means. As described supra, the apparatus 2002 may include the TX Processor 368, the RX Processor 356, and the controller/ processor 359. As such, in one configuration, the aforementioned means may be the TX Processor 368, the RX Processor 356, and the controller/processor 359 configured to perform the functions recited by the aforementioned means.

Figure 21:
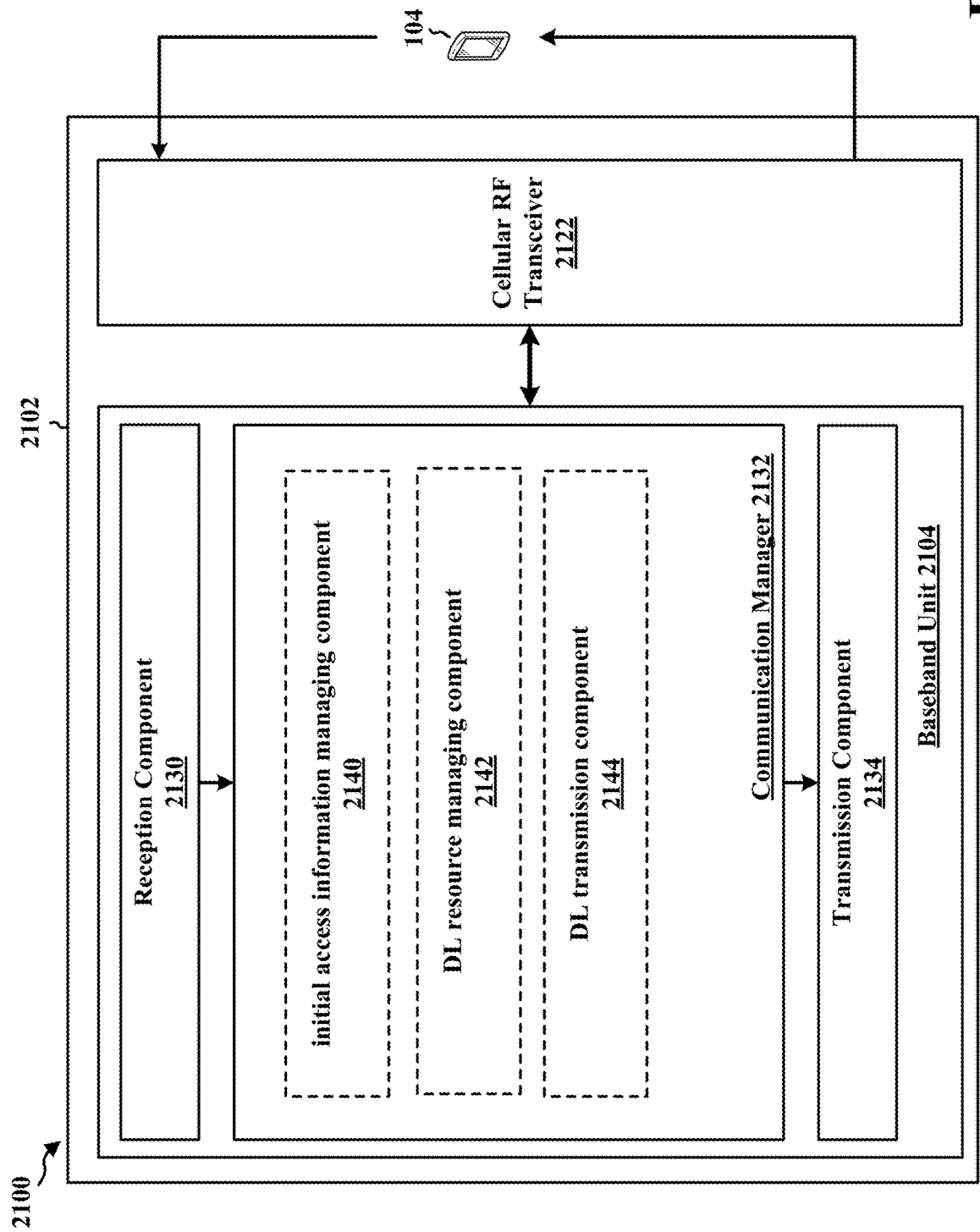
FIG. 21 is a diagram illustrating an example of a hardware implementation for an example apparatus.

FIG. 21 is a diagram 2100 illustrating an example of a hardware implementation for an apparatus 2102. The apparatus 2102 is a BS and includes a baseband unit 2104. The baseband unit 2104 may communicate through a cellular RF transceiver 2122 with the UE 104. The baseband unit 2104 may include a computer-readable medium/memory. The baseband unit 2104 is responsible for general processing, including the execution of software stored on the computer-readable medium/memory. The software, when executed by the baseband unit 2104, causes the baseband unit 2104 to perform the various functions described supra. The computer-readable medium/memory may also be used for storing data that is manipulated by the baseband unit 2104 when executing software. The baseband unit 2104 further includes a reception component 2130, a communication manager 2132, and a transmission component 2134. The communication manager 2132 includes the one or more illustrated components. The components within the communication manager 2132 may be stored in the computer-readable medium/memory and/or configured as hardware within the baseband unit 2104. The baseband unit 2104 may be a component of the base station 310 and may include the memory 376 and/or at least one of the TX processor 316, the RX processor 370, and the controller/processor 375.

The communication manager 2132 includes an initial access information managing component 2140 that is configure to determine at least one initial access structure for each beam in a plurality of beams, each of the at least one initial access structure including at least one of an SS, a PBCH, a CORESET, or a SIB, and transmit an indication of at least one initial access structure including at least one of the SS, the PBCH, the CORESET, or the SIB, e.g., as described in connection with 1902 and 1906. The communication manager 2132 includes a DL resource managing component 2142 that configure a plurality of resources for transmitting the at least one initial access structure, e.g., as described in connection with 1904. The communication manager 2132 includes a DL transmission component 2144 that is configure to transmit at least one of the SS, the PBCH, the CORESET, or the SIB via the plurality of resources based on the indication of the at least one initial access structure, and transmit at least one reference signal associated with at least one of the PBCH, the CORESET, or the SIB, e.g., as described in connection with 1908 and 1910.

The apparatus may include additional components that perform each of the blocks of the algorithm in the aforementioned flowcharts of FIGS. 17 and 19. As such, each block in the aforementioned flowcharts of FIGS. 17 and 19 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 2102, and in particular the baseband unit 2104, includes means for receiving, from a base station, an indication of at least one initial access structure for each beam in a plurality of beams, the initial access structure including at least one of an SS, a PBCH, a CORESET, or a SIB, and means for receiving, from the base station, at least one of the SS, the PBCH, the CORESET, or the SIB, via a plurality of resources based on the indication of the at least one initial access structure. The apparatus 2102 includes means for monitoring for the SS transmitted from the base station based on the indication of at least one initial access structure for each beam in the plurality of beams, and means for receiving at least one of the PBCH, the CORESET, or the SIB of the at least one initial access structure. The apparatus 2102 includes means for receiving, from the base station, at least one reference signal associated with at least one of the PBCH, the CORESET, or the SIB, means for performing a channel estimation of at least one of the SS, the PBCH, the CORESET, or the SIB based on the at least one reference signal, and means for decoding the at least one of the SS, the PBCH, the CORESET, or the SIB based on the performed channel estimation. The aforementioned means may be one or more of the aforementioned components of the apparatus 2102 configured to perform the functions recited by the aforementioned means. As described supra, the apparatus 2102 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

In some aspects, a base station may determine at least one initial access structure for each beam in a plurality of beams, each of the at least one initial access structure including at least one of an SS, a PBCH, a CORESET, or a SIB, configure a plurality of resources for transmitting the at least one initial access structure, and transmit, to a UE, an indication of the at least one initial access structure for transmitting via the plurality of resources. In one aspect, the indication may be associated with at least one of the CORESET or the SIB.

The base station may transmit, to the UE, at least one of the SS, the PBCH, the CORESET, or the SIB, via the plurality of resources based on the indication of at least one initial access structure. The UE may monitor for the SS transmitted from the base station based on the indication of at least one initial access structure for each beam in the plurality of beams and receive at least one of the PBCH, the CORESET, or the SIB of at least one initial access structure. In some aspects, at least one switching gap may be configured after at least one initial access structure, the at least one switching gap being configured based on an SCS. In one aspect, at least one switching gap may be configured within a CP of the at least one initial access structure based on an inverse of the SCS for the SS being greater than or equal to a threshold gap value.

In some aspects, the SS may be time-division multiplexed with the PBCH and may be frequency-division multiplexed with the CORESET and the SIB, where the CORESET may carry scheduling information for the SIB. In one aspect, the CORESET may be time-division multiplexed with the SIB. In another aspect, the CORESET may be frequency-division multiplexed with the SIB.

In one aspect, the SS may be time-division multiplexed with one of the PBCH or the CORESET and may be frequency-division multiplexed with the SIB, where the one of the PBCH or the CORESET may carry scheduling information for the SIB. In another aspect, the SS may be time-division multiplexed with the PBCH and may be frequency-division multiplexed with the SIB, where scheduling information for the SIB or one or more SIB parameters may be preconfigured.

In some aspects, one or more waveforms for the SS and the PBCH may be the same as or different from one or more waveforms for at least one of the CORESET or the SIB, and the one or more waveforms for the CORESET may be the same as or different from the one or more waveforms for the SIB. In some aspects, the PBCH may include a MIB indicating at least one of a frequency allocation, a bandwidth, or a time duration of the CORESET.

The base station may transmit, to the UE, at least one reference signal associated with at least one of the PBCH, the CORESET, or the SIB. In some aspects, the at least one reference signal may include a shared reference signal associated with at least one of the PBCH, the CORESET, or the SIB. The UE may perform channel estimation of at least one of the SS, the PBCH, the CORESET, or the SIB based on at least one reference signal, and decode at least one of the SS, the PBCH, the CORESET, or the SIB based on the performed channel estimation. In one aspect, a frequency bandwidth of at least one of the SS, the PBCH, the CORESET, or the SIB may be preconfigured.

In some aspects, the channel estimation of at least one of the SS, the PBCH, the CORESET, or the SIB may be performed based on a list of bandwidth candidates for at least one reference signal. In some aspects, a frequency bandwidth of at least one of the SS, the PBCH, the CORESET, or the SIB may be indicated in a reference signal of a preceding channel of at least one of the SS, the PBCH, the CORESET, or the SIB. In some aspects, the channel estimation of at least one of the SS, the PBCH, the CORESET, or the SIB may be performed based on a frequency bandwidth of a preceding channel of at least one of the SS, the PBCH, the CORESET, or the SIB.

In one aspect, at least one reference signal may include one or more frequency domain symbols in a dedicated discrete Fourier transform-spread-orthogonal frequency-division multiplexing (DFT-s-OFDM) symbol. In another aspect, at least one reference signal may include one or more frequency domain symbols subsequent to the determination of at least one initial access structure. In another aspect, at least one reference signal may include one or more time domain symbols prior to the determination of at least one initial access structure.

In some aspects, at least one of an SS, a PBCH, a CORESET, or a SIB of a previous initial access structure indicates a periodicity of at least one initial access structure. In some aspects, at least one reference signal of a previous initial access structure may indicate a periodicity of at least one initial access structure. In some aspects, a periodicity of at least one of the SS, the PBCH, the CORESET, or the SIB may be configured with at least one pattern or configured based on an SFN or at least one slot.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a base station, the method including determining at least one initial access structure for each beam in a plurality of beams, each of the at least one initial access structure including at least one of an SS, a PBCH, a CORESET, or a SIB, configuring a plurality of resources for transmitting the at least one initial access structure to a UE, and transmitting, to the UE, an indication of the at least one initial access structure for transmitting via the plurality of resources.

Aspect 2 is the method of aspect 1, where the indication is associated with at least one of the CORESET or the SIB.

Aspect 3 is the method of any of aspects 1 and 2, further including transmitting, to the UE, at least one of the SS, the PBCH, the CORESET, or the SIB, via the plurality of resources, based on the indication of at least one initial access structure.

Aspect 4 is the method of any of aspects 1 to 3, where at least one switching gap is configured after at least one initial access structure, the at least one switching gap being configured based on an SCS.

Aspect 5 is the method of any of aspects 1 to 4, where at least one switching gap is configured within a CP of the at least one initial access structure based on an inverse of an SCS for the SS being greater than or equal to a threshold gap value.

Aspect 6 is the method of any of aspects 1 to 5, where the SS is time-division multiplexed with the PBCH and is frequency-division multiplexed with the CORESET and the SIB, and where the CORESET carries scheduling information for the SIB.

Aspect 7 is the method of aspect 6, where the CORESET is time-division multiplexed with the SIB.

Aspect 8 is the method of aspect 6, where the CORESET is frequency-division multiplexed with the SIB.

Aspect 9 is the method of any of aspects 1 to 8, where the SS is time-division multiplexed with one of the PBCH or the CORESET and is frequency-division multiplexed with the SIB, and where the one of the PBCH or the CORESET carries scheduling information for the SIB.

Aspect 10 is the method of any of aspects 1 to 9, where the SS is time-division multiplexed with the PBCH and is frequency-division multiplexed with the SIB, and where scheduling information for the SIB or one or more SIB parameters are preconfigured.

Aspect 11 is the method of any of aspects 1 to 10, where one or more waveforms for the SS and the PBCH are the same as or different from one or more waveforms for at least one of the CORESET or the SIB, and where the one or more waveforms for the CORESET are the same as or different from the one or more waveforms for the SIB.

Aspect 12 is the method of any of aspects 1 to 11, where the PBCH includes a MIB indicating at least one of a frequency allocation, a bandwidth, or a time duration of the CORESET.

Aspect 13 is the method of any of aspects 1 to 12, further including transmitting, to the UE, at least one reference signal associated with at least one of the PBCH, the CORESET, or the SIB.

Aspect 14 is the method of aspect 13, where the at least one reference signal includes a shared reference signal associated with at least one of the PBCH, the CORESET, or the SIB.

Aspect 15 is the method of aspect 13, where at least one reference signal includes one or more frequency domain symbols in a dedicated discrete DFT-s-OFDM symbol.

Aspect 16 is the method of aspect 13, where at least one reference signal includes one or more frequency domain symbols subsequent to the determination of at least one initial access structure.

Aspect 17 is the method of aspect 13, where at least one reference signal includes one or more time domain symbols prior to the determination of at least one initial access structure.

Aspect 18 is the method of any of aspects 1 to 17, where at least one of an SS, a PBCH, a CORESET, or a SIB of a previous initial access structure indicates a periodicity of at least one initial access structure.

Aspect 19 is the method of any of aspects 1 to 18, where at least one reference signal of a previous initial access structure indicates a periodicity of the at least one initial access structure.

Aspect 20 is the method of any of aspects 1 to 19, where a periodicity of the at least one of the SS, the PBCH, the CORESET, or the SIB is configured with at least one pattern or configured based on an SFN or at least one slot.

Aspect 21 is an apparatus for wireless communication including at least one processor coupled to a memory and configured to implement a method as in any of aspects 1 to 20.

Aspect 22 is an apparatus for wireless communication including means for implementing a method as in any of aspects 1 to 20.

Aspect 23 is a computer-readable medium storing computer-executable code, where the code, when executed by a processor, causes the processor to implement a method as in any of aspects 1 to 20.

Aspect 24 is a method of wireless communication at a UE, the method including receiving, from a base station, an indication of at least one initial access structure for each beam in a plurality of beams, the initial access structure including at least one of an SS, a PBCH, a CORESET, or a SIB, and receiving, from the base station, at least one of the SS, the PBCH, the CORESET, or the SIB, via a plurality of resources, based on the indication of the at least one initial access structure.

Aspect 25 is the method of aspect 24, where the indication is associated with at least one of the CORESET or the SIB.

Aspect 26 is the method of any of aspects 24 and 25, further including monitoring for the SS transmitted from the base station based on the indication of at least one initial access structure for each beam in the plurality of beams and receiving at least one of the PBCH, the CORESET, or the SIB of the at least one initial access structure.

Aspect 27 is the method of any of aspects 24 to 26, where at least one switching gap is configured after at least one initial access structure, the at least one switching gap being configured based on an SCS.

Aspect 28 is the method of aspect 27, where at least one switching gap is configured within a CP of the at least one initial access structure based on an inverse of an SCS for the SS being greater than or equal to a threshold gap value.

Aspect 29 is the method of any of aspects 24 to 28, where the SS is time-division multiplexed with the PBCH and is frequency-division multiplexed with the CORESET and the SIB, and the CORESET carries scheduling information for the SIB.

Aspect 30 is the method of aspect 29, where the CORESET is time-division multiplexed with the SIB.

Aspect 31 is the method of aspect 29, where the CORESET is frequency-division multiplexed with the SIB.

Aspect 32 is the method of any of aspects 24 to 31, where the SS is time-division multiplexed with one of the PBCH or the CORESET and is frequency-division multiplexed with the SIB, and the one of the PBCH or the CORESET carries scheduling information for the SIB.

Aspect 33 is the method of any of aspects 24 to 32, where the SS is time-division multiplexed with the PBCH and is frequency-division multiplexed with the SIB, where scheduling information for the SIB or one or more SIB parameters are preconfigured.

Aspect 34 is the method of any of aspects 24 to 33, where one or more waveforms for the SS and the PBCH are the same as or different from one or more waveforms for at least one of the CORESET or the SIB, and where the one or more waveforms for the CORESET are the same as or different from the one or more waveforms for the SIB.

Aspect 35 is the method of any of aspects 24 to 34, where the PBCH includes a MIB indicating at least one of a frequency allocation, a bandwidth, or a time duration of the CORESET.

Aspect 36 is the method of any of aspects 24 to 35, further including receiving, from the base station, at least one reference signal associated with at least one of the PBCH, the CORESET, or the SIB.

Aspect 37 is the method of aspect 36, where the at least one reference signal includes a shared reference signal associated with at least one of the SS, the PBCH, the CORESET, or the SIB.

Aspect 38 is the method of aspect 36, further including performing a channel estimation of at least one of the SS, the PBCH, the CORESET, or the SIB based on at least one reference signal, and decoding the at least one of the SS, the PBCH, the CORESET, or the SIB based on the performed channel estimation.

Aspect 39 is the method of aspect 38, where a frequency bandwidth of at least one of the SS, the PBCH, the CORESET, or the SIB is preconfigured.

Aspect 40 is the method of aspect 38, where the channel estimation of at least one of the SS, the PBCH, the CORESET, or the SIB is performed based on a list of bandwidth candidates for at least one reference signal.

Aspect 41 is the method of aspect 38, where a frequency bandwidth of at least one of the SS, the PBCH, the CORESET, or the SIB is indicated in a reference signal of a preceding channel of at least one of the SS, the PBCH, the CORESET, or the SIB.

Aspect 42 is the method of aspect 38, where the channel estimation of at least one of the SS, the PBCH, the CORESET, or the SIB is performed based on a frequency bandwidth of a preceding channel of at least one of the SS, the PBCH, the CORESET, or the SIB.

Aspect 43 is the method of any of aspects 24 to 42, where at least one of a SS, a PBCH, a CORESET, or a SIB of a previous initial access structure indicates a periodicity of at least one initial access structure.

Aspect 44 is the method of any of aspects 24 to 43, where at least one reference signal of a previous initial access structure indicates a periodicity of the at least one initial access structure.

Aspect 45 is the method of any of aspects 24 to 44, where the periodicity of at least one of the SS, the PBCH, the CORESET, or the SIB is configured with at least one pattern or configured based on an SFN or at least one slot.

Aspect 46 is an apparatus for wireless communication including at least one processor coupled to a memory and configured to implement a method as in any of aspects 24 to 45.

Aspect 47 is an apparatus for wireless communication including means for implementing a method as in any of aspects 24 to 45.

Aspect 48 is a computer-readable medium storing computer-executable code, where the code, when executed by a processor, causes the processor to implement a method as in any of aspects 24 to 45.

What is claimed is:

1. An apparatus for wireless communication, comprising:
a memory; and
at least one processor coupled to the memory and configured to:
determine a first initial access structure for a first beam in a plurality of beams, the first initial access structure including at least one of a first synchronization signal (SS), a first physical broadcast channel (PBCH), a first control resource set (CORESET), or a first system information block (SIB);
configure a plurality of resources for transmitting the first initial access structure to a user equipment (UE);
transmit, to the UE, an indication of the first initial access structure for transmitting via the plurality of resources; and
transmit, to the UE, the first SS, the first PBCH, and the first CORESET, via the plurality of resources based on the indication of the first initial access structure, the SS, the PBCH, and the CORESET being transmitted in a single block, wherein at least one beam switching gap is configured after the first initial access structure for the first beam and before a second initial access structure for a second beam in the plurality of beams.

2. The apparatus of claim 1, wherein the indication is associated with at least one of the CORESET or the SIB.

3. The apparatus of claim 1, wherein the at least one processor is further configured to transmit, to the UE, the SIB, via the plurality of resources based on the indication of the first initial access structure.

4. The apparatus of claim 1, wherein the at least one beam switching gap being configured based on a subcarrier spacing (SCS).

5. The apparatus of claim 4, wherein the at least one beam switching gap is configured within a cyclic prefix (CP) of the first initial access structure based on an inverse of a subcarrier spacing (SCS) for the SS being greater than or equal to a threshold gap value.

6. The apparatus of claim 1, wherein the SS is time-division multiplexed with the PBCH and is frequency-division multiplexed with the CORESET and the SIB,
wherein the CORESET carries scheduling information for the SIB.

7. The apparatus of claim 1, wherein the SS is time-division multiplexed with one of the PBCH or the CORESET and is frequency-division multiplexed with the SIB,
wherein the one of the PBCH or the CORESET carries scheduling information for the SIB.

8. The apparatus of claim 1, wherein one or more waveforms for the SS and the PBCH are same as or different from one or more waveforms for at least one of the CORESET or the SIB,
wherein the one or more waveforms for the CORESET are same as or different from the one or more waveforms for the SIB.

9. The apparatus of claim 1, wherein the at least one processor is further configured to transmit, to the UE, at least one reference signal associated with at least one of the PBCH, the CORESET, or the SIB.

10. The apparatus of claim 9, wherein the at least one reference signal comprises a shared reference signal associated with the at least one of the PBCH, the CORESET, or the SIB.

11. A method of wireless communication at a base station, comprising:
determining a first initial access structure for a first beam in a plurality of beams, the first initial access structure including at least one of a synchronization signal (SS), a physical broadcast channel (PBCH), a control resource set (CORESET), or a system information block (SIB);
configuring a plurality of resources for transmitting the first initial access structure to a user equipment (UE);
transmitting, to the UE, an indication of the first initial access structure for transmitting via the plurality of resources; and
transmitting, to the UE, the SS, the PBCH, and the CORESET, via the plurality of resources based on the indication of the first initial access structure, the SS, the PBCH, and the CORESET being transmitted in a single block, wherein at least one beam switching gap is configured after the first initial access structure for the first beam and before a second initial access structure for a second beam in the plurality of beams.

12. The method of claim 11, further comprising transmitting, to the UE, the SIB, via the plurality of resources based on the indication of the first initial access structure.

13. The method of claim 11, further comprising transmitting, to the UE, at least one reference signal associated with at least one of the PBCH, the CORESET, or the SIB.

14. An apparatus for wireless communication, comprising:
a memory; and
at least one processor coupled to the memory and configured to:
receive, from a base station, an indication of a first initial access structure for a first beam in a plurality of beams, the first initial access structure including at least one of a synchronization signal (SS), a physical broadcast channel (PBCH), a control resource set (CORESET), or a system information block (SIB); and
receive, from the base station, the SS, the PBCH, and the CORESET, via a plurality of resources based on the indication of the first initial access structure, the SS, the PBCH, and the CORESET being received in a single block, wherein at least one beam switching gap is configured after the first initial access structure for the first beam and before a second initial access structure for a second beam in the plurality of beams.

15. The apparatus of claim 14, wherein the indication is associated with at least one of the CORESET or the SIB.

16. The apparatus of claim 14, wherein the at least one processor is further configured to:
monitor for the SS transmitted from the base station based on the indication of the first initial access structure for the first beam in the plurality of beams; and
receive the at least one of the PBCH, the CORESET, or the SIB of the first initial access structure.

17. The apparatus of claim 14, the at least one beam switching gap being configured based on a subcarrier spacing (SCS).

18. The apparatus of claim 17, wherein at least one beam switching gap is configured within a cyclic prefix (CP) of the first initial access structure based on an inverse of a subcarrier spacing (SCS) for the SS being greater than or equal to a threshold gap value.

19. The apparatus of claim 14, wherein the SS is time-division multiplexed with the PBCH and is frequency-division multiplexed with the CORESET and the SIB, wherein the CORESET carries scheduling information for the SIB.

20. The apparatus of claim 14, wherein the SS is time-division multiplexed with one of the PBCH or the CORESET and is frequency-division multiplexed with the SIB, wherein the one of the PBCH or the CORESET carries scheduling information for the SIB.

21. The apparatus of claim 14, wherein one or more waveforms for the SS and the PBCH are same as or different from one or more waveforms for at least one of the CORESET or the SIB, and wherein the one or more waveforms for the CORESET are same as or different from the one or more waveforms for the SIB.

22. The apparatus of claim 14, wherein the at least one processor is further configured to receive, from the base station, at least one reference signal associated with at least one of the PBCH, the CORESET, or the SIB.

23. The apparatus of claim 22, wherein the at least one reference signal comprises a shared reference signal associated with the at least one of the SS, the PBCH, the CORESET, or the SIB.

24. The apparatus of claim 22, wherein the at least one processor is further configured to:
perform a channel estimation of at least one of the SS, the PBCH, the CORESET, or the SIB based on the at least one reference signal; and
decode the at least one of the SS, the PBCH, the CORESET, or the SIB based on the performed channel estimation.

25. The apparatus of claim 24, wherein to perform the channel estimation, the at least one processor is configured to perform the channel estimation of at least one of the SS, the PBCH, the CORESET, or the SIB based on a frequency bandwidth of a preceding channel of the at least one of the SS, the PBCH, the CORESET, or the SIB.

26. The apparatus of claim 14, wherein at least one of a SS, a PBCH, a CORESET, or a SIB of a previous initial access structure indicates a periodicity of the at least one initial access structure.

27. A method of wireless communication at a user equipment (UE), comprising:
receiving, from a base station, an indication of a first initial access structure for a first beam in a plurality of beams, the first initial access structure including at least one of a synchronization signal (SS), a physical broadcast channel (PBCH), a control resource set (CORESET), or a system information block (SIB); and
receiving, from the base station, the SS, the PBCH, and the CORESET, via a plurality of resources, based on the indication of the first initial access structure, the SS, the PBCH, and the CORESET being received in a single block, wherein at least one beam switching gap is configured after the first initial access structure for the first beam and before a second initial access structure for a second beam in the plurality of beams.

28. The method of claim 27, further comprising:
monitoring for the SS transmitted from the base station based on the indication of the first initial access structure for each beam in the plurality of beams; and
receiving the at least one of the PBCH, the CORESET, or the SIB of the first initial access structure.

29. The method of claim 27, further comprising receiving, from the base station, at least one reference signal associated with at least one of the PBCH, the CORESET, or the SIB.

30. The method of claim 29, further comprising:
performing a channel estimation of at least one of the SS, the PBCH, the CORESET, or the SIB based on the at least one reference signal; and
decoding the at least one of the SS, the PBCH, the CORESET, or the SIB based on the performed channel estimation.

* * * * *